United States Patent
Kadowaki

(10) Patent No.: US 7,720,089 B2
(45) Date of Patent: May 18, 2010

(54) SERIAL COMMUNICATION DEVICE, METHOD THEREOF AND COMMUNICATION SYSTEM USING THE SAME

(75) Inventor: Yukio Kadowaki, Nara (JP)

(73) Assignee: Ricoh Company, Ltd., Tokyo (JP)

( * ) Notice: Subject to any disclaimer, the term of this patent is extended or adjusted under 35 U.S.C. 154(b) by 1163 days.

(21) Appl. No.: 10/562,436

(22) PCT Filed: Jun. 28, 2005

(86) PCT No.: PCT/JP2005/012272

§ 371 (c)(1),
(2), (4) Date: Dec. 28, 2005

(87) PCT Pub. No.: WO2006/004070

PCT Pub. Date: Jan. 12, 2006

(65) Prior Publication Data

US 2006/0187969 A1    Aug. 24, 2006

(30) Foreign Application Priority Data

Jun. 30, 2004    (JP)    ............................. 2004-193040

(51) Int. Cl.
 *H04B 7/212*    (2006.01)
(52) U.S. Cl. ...................................... 370/443; 370/498
(58) Field of Classification Search ................. 370/476, 370/294
See application file for complete search history.

(56) References Cited

U.S. PATENT DOCUMENTS

| 4,623,992 | A  | 11/1986 | Kurosaki et al. |
| 4,964,141 | A  | 10/1990 | Matsushima et al. |
| 5,862,354 | A  | 1/1999 | Curiger et al. |
| 5,978,927 | A  | 11/1999 | Curry et al. |
| 6,108,751 | A  | 8/2000 | Lee et al. |
| 6,239,732 | B1 | 5/2001 | Cusay |
| 6,412,072 | B2 | 6/2002 | Little et al. |
| 2003/0152280 | A1 | 8/2003 | Kadowaki et al. |
| 2004/0131265 | A1 | 7/2004 | Yagishita et al. |
| 2004/0136596 | A1 | 7/2004 | Oneda et al. |
| 2004/0136599 | A1 | 7/2004 | Kadowaki et al. |
| 2004/0146209 | A1 | 7/2004 | Kadowaki et al. |

(Continued)

FOREIGN PATENT DOCUMENTS

JP    54-13708 A    2/1979

(Continued)

*Primary Examiner*—Huy D Vu
*Assistant Examiner*—Michael J Digiovanni
(74) *Attorney, Agent, or Firm*—Dickstein Shapiro LLP

(57) ABSTRACT

A compact serial communication device is disclosed that is formed from simplified circuits on a master side and a slave side and does not need a synchronous signal and a switching unit for switching transmission and reception operations, and is able to reduce load of the slave side. The master transmission/reception circuit outputs a serial data signal DATA to a transmission path with the serial data signal DATA being generated by superposing a low level superposition pulse on a clock signal, when the clock signal is at the high level, according to an output data signal to be output to the slave transmission/reception circuits; the slave transmission/reception circuits superposes a high level superposition pulse on the serial data signal DATA input from the transmission path according to an output data signal to be output to the master transmission/reception circuit when the clock signal is at the low level.

19 Claims, 18 Drawing Sheets

U.S. PATENT DOCUMENTS

| | | |
|---|---|---|
| 2004/0151385 A1 | 8/2004 | Oneda et al. |
| 2004/0163038 A1 | 8/2004 | Yano et al. |
| 2004/0208339 A1 | 10/2004 | Abe et al. |
| 2004/0264785 A1 | 12/2004 | Suino et al. |
| 2005/0084169 A1 | 4/2005 | Kadowaki |
| 2006/0280112 A1* | 12/2006 | Fujii .......................... 370/204 |

FOREIGN PATENT DOCUMENTS

| | | |
|---|---|---|
| JP | 59-135949 A | 8/1984 |
| JP | 59-163935 A | 9/1984 |
| JP | 63-257860 A | 10/1988 |
| JP | 2002-101076 A | 4/2002 |

* cited by examiner

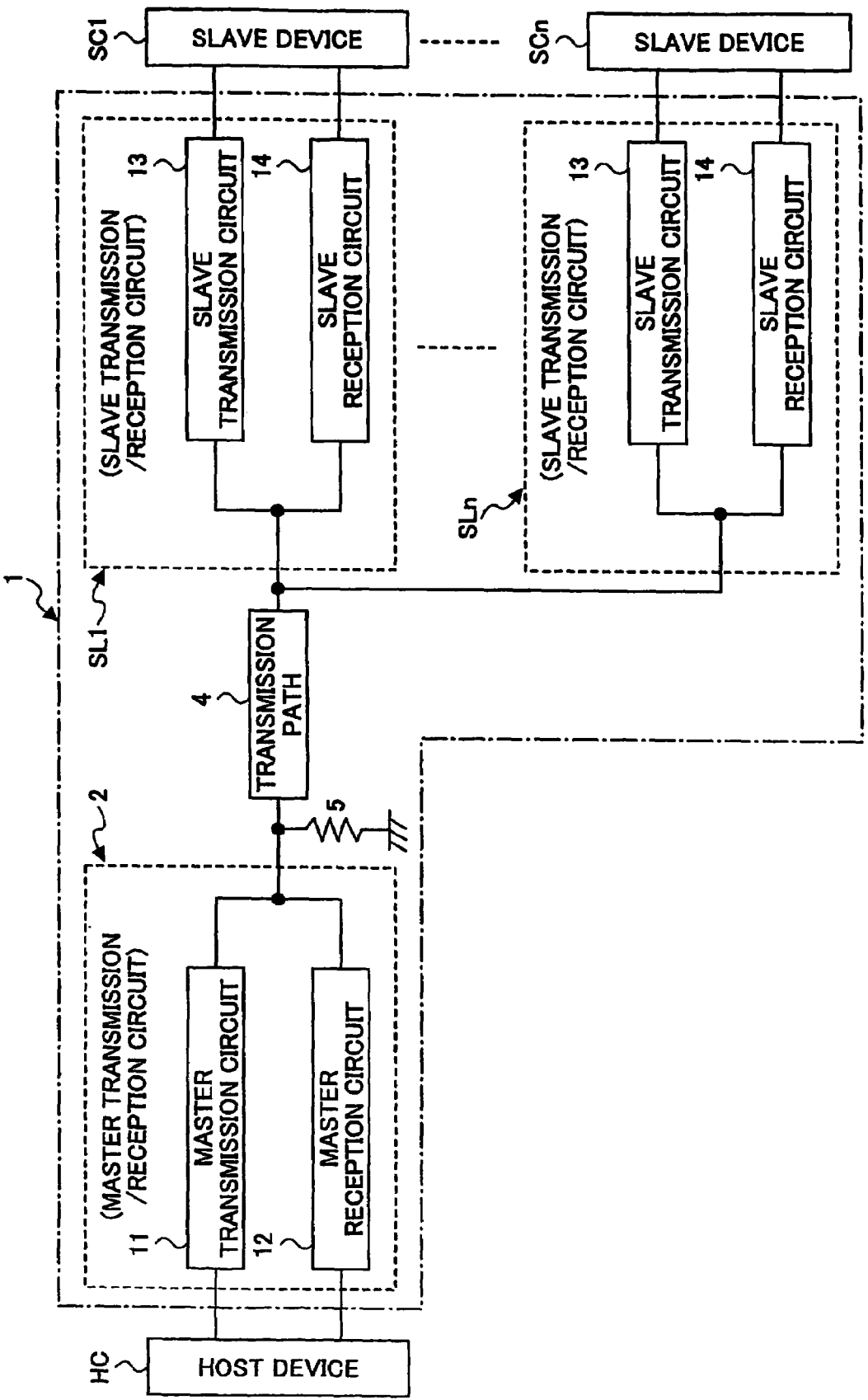

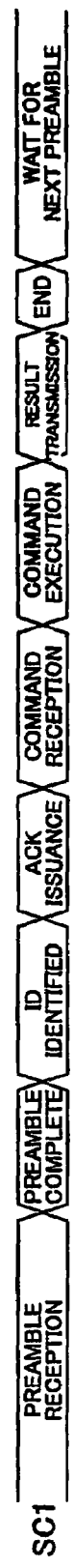

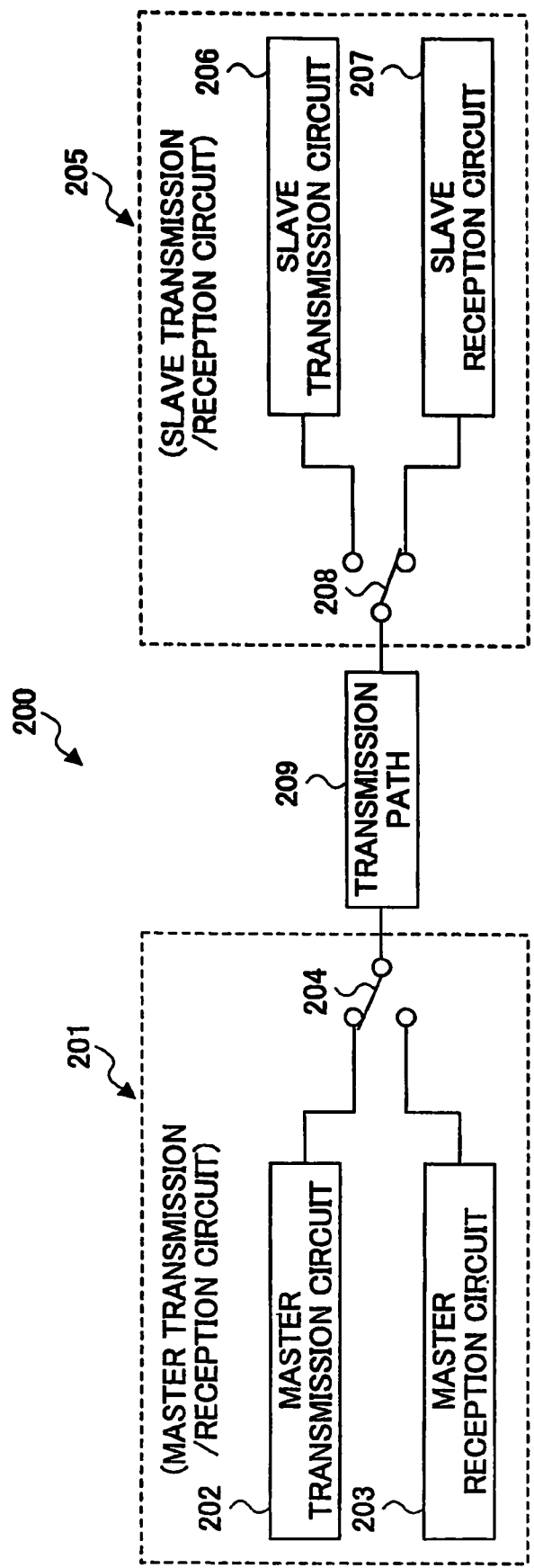

SERIAL COMMUNICATION DEVICE, METHOD THEREOF AND COMMUNICATION SYSTEM USING THE SAME

TECHNICAL FIELD

The present invention relates to a serial communication device, a communication method of the device, and a communication system using the communication device, and particularly, a serial communication device performing serial communication by means of half-duplex communication, a communication method of the serial communication device, and a communication system using the serial communication device.

BACKGROUND ART

It is known that there are various methods of transmitting serial signals in serial communications. FIG. 17 through FIG. 20 illustrate typical ones of such methods.

FIG. 17 exemplifies a method of the related art for transmitting serial signals in serial communications.

In FIG. 17, a data signal SdA is a common data signal, in which data values are directly represented by signal levels, and data values are extracted from the data signal SdA by using a synchronization signal SaA, which delimits different data. In this method, two signals, such as the data signal SdA and the synchronization signal SaA are used.

FIG. 18 exemplifies another method of the related art for transmitting serial signals in serial communications.

In FIG. 18, a data signal SdB is a pulse width modulation signal, in which signal intervals are constant, and pulse widths differ between when the data value is "0" and when the data value is "1". With this method, although the code interval thereof is a problem, it is possible to perform asynchronous operations.

For this technique, for example, reference can be made to U.S. Pat. No. 698,066, U.S. Pat. No. 5,862,354, U.S. Pat. No. 5,978,927, U.S. Pat. No. 6,108,751, U.S. Pat. No. 6,239,732, U.S. Pat. No. 6,412,072, and U.S. Pat. No. 5,803,518.

FIG. 19 exemplifies another method of the related art for transmitting serial signals in serial communications.

In FIG. 19, a data signal SdC is a pulse position modulation signal in which pulse positions change along time, and data are sampled with a synchronization signal SaC serving as a time reference.

FIG. 20 exemplifies still another method of the related art for transmitting serial signals in serial communications.

In FIG. 20, a data signal SdD is a signal used in an infrared remote controller, and is obtained by combining the pulse width modulation and the pulse position modulation signal. However, because data intervals are not constant in the data signal SdD, the data signal SdD is an asynchronous signal, therefore, a synchronization signal is not needed.

FIG. 21 is a block diagram illustrating a serial communication device of the related art for performing half-duplex communications.

In FIG. 21, a serial communication device 200 includes a master transmission/reception circuit 201 and a slave transmission/reception circuit 205. The master transmission/reception circuit 201 includes a master transmission circuit 202, a master reception circuit 203, and a master switching section 204 for transmission authority control. Similarly, the slave transmission/reception circuit 205 includes a slave transmission circuit 206, a slave reception circuit 207, and a slave switching section 208 for transmission authority control.

Basically, the master transmission circuit 202 is the same as the slave transmission circuit 206, and the master reception circuit 203 is the same as the slave reception circuit 207.

Here, when the transmission authority is on the master transmission/reception circuit 201, data are transmitted from the master transmission circuit 202 of the master transmission/reception circuit 201 to the slave reception circuit 207 of the slave transmission/reception circuit 205. Meanwhile, if the transmission authority is transferred to the slave transmission/reception circuit 205, data are transmitted from the slave transmission circuit 206 of the slave transmission/reception circuit 205 to the master reception circuit 203 of the master transmission/reception circuit 201.

However, as described above, in the related art, a synchronous signal is required. Even if the synchronous signal is not used, the circuits for generating data signals from data or extracting the data from the data signals are complicated. Further, in order to perform the half-duplex communication, the same circuit as that on the master side is required on the slave side, and switching units for switching between transmission operations and reception operations are needed. For this reason, the scale of the circuit is large, and space and cost of the circuit increase.

DISCLOSURE OF THE INVENTION

It is a general object of the present invention to solve one or more of the problems of the related art.

A specific object of the present invention is to provide a compact and inexpensive serial communication device that is formed from simplified circuits on a master side and a slave side, does not use a synchronous signal and a unit for switching transmission operations and reception operations, and is able to reduce the workload of the slave side; and to provide a communication method of the serial communication device, and a communication system using the serial communication device.

According to a first aspect of the present invention, there is provided a serial communication device that includes a first transmission/reception circuit and at least one second transmission/reception circuit connected with the first transmission/reception circuit in a transmission path, and performs serial communication by half-duplex communication between the first transmission/reception circuit and the second transmission/reception circuit, wherein the first transmission/reception circuit outputs a serial data signal DATA to the transmission path, said serial data signal DATA being generated by superposing a first superposition pulse having a second level to a portion of a clock signal input from outside having a first level according on binary first transmission data to be output to the second transmission/reception circuit, said clock signal being a binary signal, said second level being reciprocal to said first level; and the second transmission/reception circuit superposes a second superposition pulse having the first level to a portion of the serial data signal DATA input from the transmission path according to binary second transmission data to be output to the first transmission/reception circuit, said portion corresponding to a duration of the clock signal having the second level.

As an embodiment, the first transmission/reception circuit comprises a first transmission circuit that superposes the first superposition pulse on the portion of the clock signal having the first level, and outputs the serial data signal DATA to the transmission path; and a first reception circuit that extracts the second superposition pulse from the serial data signal DATA to extract the second transmission data.

As an embodiment, the second transmission/reception circuit comprises a second transmission circuit that superposes the second superposition pulse on the portion of the serial data signal DATA corresponding to the duration of the clock signal having the second level and transmits a resulting signal to the transmission path; and a second reception circuit that extracts the first superposition pulse from the serial data signal DATA input from the first transmission/reception circuit to extract the second transmission data.

Preferably, the first transmission circuit superposes the first superposition pulse having the second level and a pulse width T1 on the portion of the clock signal having the first level and a pulse width T3 starting from a predetermined starting point after a time period T2 elapses from the starting point to indicate one of two levels of one bit data in the serial data signal DATA, or the second transmission circuit indicates another one of the two levels of one bit data in the serial data signal DATA when the first superposition pulse is absent after the time period T2 elapses from the starting point; and the first transmission circuit generates and outputs the serial data signal DATA one bit by one bit consecutively to perform serial communication so that the pulse width T1, the pulse width T3, and the time period T2 satisfy T1<T2<T3, and (T1+T2)<T3.

Preferably, the second transmission circuit superposes the second superposition pulse having the first level and a pulse width T1 on the portion of the serial data signal DATA having the second level corresponding to the duration of the clock signal having the second level and a pulse width T3 starting from a predetermined starting point after the time period T2 elapses from the starting point to indicate one of two levels of one bit data in the serial data signal DATA, or the second transmission circuit indicates another one of the two levels of one bit data in the serial data signal DATA when the second superposition pulse is absent after the time period T2 elapses from the starting point; and the second transmission circuit generates and outputs the serial data signal DATA one bit by one bit-consecutively to perform serial communication so that the pulse width T1, the pulse width T3, and the time period T2 satisfy T1<T2<T3, and (T1+T2)<T3.

As an embodiment, the first transmission circuit comprises a first T2 delay circuit that delays the clock signal by the time period T2 and outputs said delayed signal; a first T1 delay circuit that delays the output signal from the first T2 delay circuit by a time period T1 and outputs said delayed signal; a first superposition pulse generation circuit that generates the first superposition pulse having the pulse width T1 from the output signal from the first T2 delay circuit and the output signal from the first T1 delay circuit; and a first output signal generation circuit that superposes the first superposition pulse from the first superposition pulse generation circuit on the clock signal according to the first transmission data, and generates data equaling to one bit sequentially to generate the serial data signal DATA and to transmit the serial data signal DATA to the transmission path.

As an embodiment, the first reception circuit comprises: a first T4 delay circuit that delays the received serial data signal DATA by a time period T4 equaling to or greater than (T1+T2), and outputs said delayed signal; a first input signal delay circuit that delays the output signal from the first T4 delay circuit by a predetermined time period and outputs said delayed signal; and a first data extraction circuit that extracts the second transmission data from the received serial data signal DATA and the output signal from the first input signal delay circuit, and outputs the extracted signal.

As an embodiment, the second reception circuit comprises: a second T4 delay circuit that delays the received serial data signal DATA by the time period T4 equaling to or greater than (T1+T2), and outputs said delayed signal; a second input signal delay circuit that delays the output signal from the second T4 delay circuit by a predetermined time period and outputs said delayed signal; and a second data extraction circuit that extracts the first transmission data from the received serial data signal DATA and the output signal from the second input signal delay circuit, and outputs the extracted signal.

As an embodiment, the second transmission circuit comprises: a second T2 delay circuit that delays the received serial data signal DATA by the time period T2 and outputs said delayed signal; a second T1 delay circuit that delays the output signal from the second T2 delay circuit by a time period T1 and outputs said delayed signal; a second superposition pulse generation circuit that generates the second superposition pulse having the pulse width T1 from the output signal from the second T2 delay circuit and the output signal from the second T1 delay circuit; and a second output signal generation circuit that superposes, according to the second transmission data, the second superposition pulse output from the second superposition pulse generation circuit to the portion of the received serial data signal DATA corresponding to the duration of the clock signal having the second level, and generates data equaling to one bit sequentially to generate the serial data signal DATA and to transmit the serial data signal DATA to the transmission path.

As an embodiment, the first output signal generation circuit sets an output terminal to be in a high impedance state when the serial data signal DATA is at the second level.

As an embodiment, when the transmission path is pulled down by a pull-down resistance, the first output signal generation circuit shorts the pull-down resistance for a predetermined time period at falling time of the serial data signal DATA.

As an embodiment, when the transmission path is pulled up by a pull-up resistance, the first output signal generation circuit shorts the pull-up resistance for a predetermined time period at rising time of the serial data signal DATA.

As an embodiment, the second output signal generation circuit sets an output terminal to be in a high impedance state when the serial data signal DATA is at the first level.

As an embodiment, when the transmission path is pulled down by a pull-down resistance, the second output signal generation circuit shorts the pull-down resistance for a predetermined time period at falling time of the serial data signal DATA.

As an embodiment, when the transmission path is pulled up by a pull-up resistance, the second output signal generation circuit shorts the pull-up resistance for a predetermined time period at rising time of the serial data signal DATA.

According to a second aspect of the present invention, there is provided a serial communication method of a serial communication device that includes a first transmission/reception circuit and at least one second transmission/reception circuit connected with the first transmission/reception circuit in a transmission path, and performs serial communication by half-duplex communication between the first transmission/reception circuit and the second transmission/reception circuit, said method comprising the steps of: superposing a first superposition pulse having a second level on a portion of a clock signal input from outside having a first level according to binary first transmission data to be output to the second transmission/reception circuit, outputting a resulting serial data signal DATA to the transmission path, said clock signal being a binary signal, said second level being reciprocal to said first level; and superposing a second superposition pulse having the first level on a portion of the serial data signal DATA input from the transmission path corresponding to a duration of the clock signal having the second level according to binary second transmission data to be output to the first transmission/reception circuit.

As an embodiment, the step of superposing a first superposition pulse includes the steps of: superposing the first superposition pulse having the second level and a pulse width T1 on the portion of the clock signal having the first level and a pulse width T3 starting from a predetermined starting point after a time period T2 elapses from the starting point to indicate one of two levels of one bit data in the serial data signal DATA, or indicating another one of the two levels of one bit data in the serial data signal DATA when the first superposition pulse is absent after the time period T2 elapses from the starting point; and generating and outputting the serial data signal DATA one bit by one bit consecutively to perform serial communication so that the pulse width T1, the pulse width T3, and the time period T2 satisfy: T1<T2<T3, and (T1+T2)<T3.

As an embodiment, the step of superposing a second superposition pulse includes the steps of: superposing the second superposition pulse having the first level and a pulse width T1 on the portion of the serial data signal DATA having the second level corresponding to the duration of the clock signal having the second level and a pulse width T3 starting from a predetermined starting point after the time period T2 elapses from the starting point to indicate one of two levels of one bit data in the serial data signal DATA, or indicating another one of the two levels of one bit data in the serial data signal DATA when the second superposition pulse is absent after the time period T2 elapses from the starting point; and generating and outputting the serial data signal DATA one bit by one bit consecutively to perform serial communication so that the pulse width T1, the pulse width T3, and the time period T2 satisfy: T1<T2<T3, and (T1+T2)<T3.

According to a third aspect of the present invention, there is provided a communication system comprising a serial communication device that includes a first transmission/reception circuit connected to a host device and at least one second transmission/reception circuit connected corresponding to slave devices able to communicate with the host device, and performs serial communication by half-duplex communication between the first transmission/reception circuit and the second transmission/reception circuit, said first transmission/reception circuit and said second transmission/reception circuit being connected with each other in a transmission path, wherein the first transmission/reception circuit of the serial communication device outputs a serial data signal DATA to second transmission/reception circuit via the transmission path, said serial data signal DATA being generated by superposing a first superposition pulse having a second level on a portion of a clock signal input from the host device having a first level according to binary first transmission data to be transmitted from the host device to the slave device, said clock signal being a binary signal, said second level being reciprocal to said first level; and the second transmission/reception circuit of the serial communication device superposes a second superposition pulse having the first level on a portion of the serial data signal DATA input from the first transmission/reception circuit transmission path according to binary second transmission data to be output from the corresponding slave device to the host device, said portion corresponding to a duration of the clock signal having the second level.

As an embodiment, the first transmission/reception circuit comprises: a first transmission circuit that superposes the first superposition pulse on the portion of the clock signal having the first level, and outputs the serial data signal DATA to the transmission path; and a first reception circuit that extracts the second superposition pulse from the serial data signal DATA to extract the second transmission data.

As an embodiment, the second transmission/reception circuit comprises: a second transmission circuit that superposes the second superposition pulse on the portion of the serial data signal DATA corresponding to the duration of the clock signal having the second level and transmits a resulting signal to the transmission path; and a second reception circuit that extracts the first superposition pulse from the serial data signal DATA input from the first transmission/reception circuit to extract the second transmission data.

As an embodiment, the first transmission circuit superposes the first superposition pulse having the second level and a pulse width T1 on the portion of the clock signal having the first level and a pulse width T3 starting from a predetermined starting point after a time period T2 elapses from the starting point to indicate one of two levels of one bit data in the serial data signal DATA, or the second transmission circuit indicates another one of the two levels of one bit data in the serial data signal DATA when the first superposition pulse is absent after the time period T2 elapses from the starting point; and the first transmission circuit generates and outputs the serial data signal DATA one bit by one bit consecutively to perform serial communication so that the pulse width T1, the pulse width T3, and the time period T2 satisfy: T1<T2<T3, and (T1+T2)<T3.

As an embodiment, the second transmission circuit superposes the second superposition pulse having the first level and a pulse width T1 on the portion of the serial data signal DATA having the second level corresponding to the duration of the clock signal having the second level and a pulse width T3 starting from a predetermined starting point after the time period T2 elapses from the starting point to indicate one of two levels of one bit data in the serial data signal DATA, or the second transmission circuit indicates another one of the two levels of one bit data in the serial data signal DATA when the second superposition pulse is absent after the time period T2 elapses from the starting point; and the second transmission circuit generates and outputs the serial data signal DATA one bit by one bit consecutively to perform serial communication so that the pulse width T1, the pulse width T3, and the time period T2 satisfy: T1<T2<T3, and (T1+T2)<T3.

According to the serial communication device related to the present invention, and a communication method thereof and a communication system using the serial communication device, one-wire communication using one channel can be realized with fewer circuits and without a switching unit for switching transmission operations and reception operations; thereby, it is possible to reduce the size and cost of the device, and further, the communication lines can be constructed to have a bus structure.

In addition, according to the serial communication device related to the present invention and the communication system using the serial communication device, the waveform of the serial data signal DATA can be made sharp; thus it is possible to realize high speed operation, prevent signal conflict in the transmission path, and therefore, excess power consumption is preventable.

These and other objects, features, and advantages of the present invention will become more apparent from the following detailed description of preferred embodiments given with reference to the accompanying drawings.

BRIEF DESCRIPTION OF THE DRAWINGS

FIG. 1 is a block diagram schematically-illustrating a serial communication device according to an embodiment of the present invention;

FIG. 2A through FIG. 2E show a timing chart of a communication protocol of the serial communication device 1 in FIG. 1;

FIG. 21 is a block diagram illustrating a serial communication device of the related art for performing half-duplex communications.

BEST MODE FOR CARRYING OUT THE INVENTION

Figure 3:
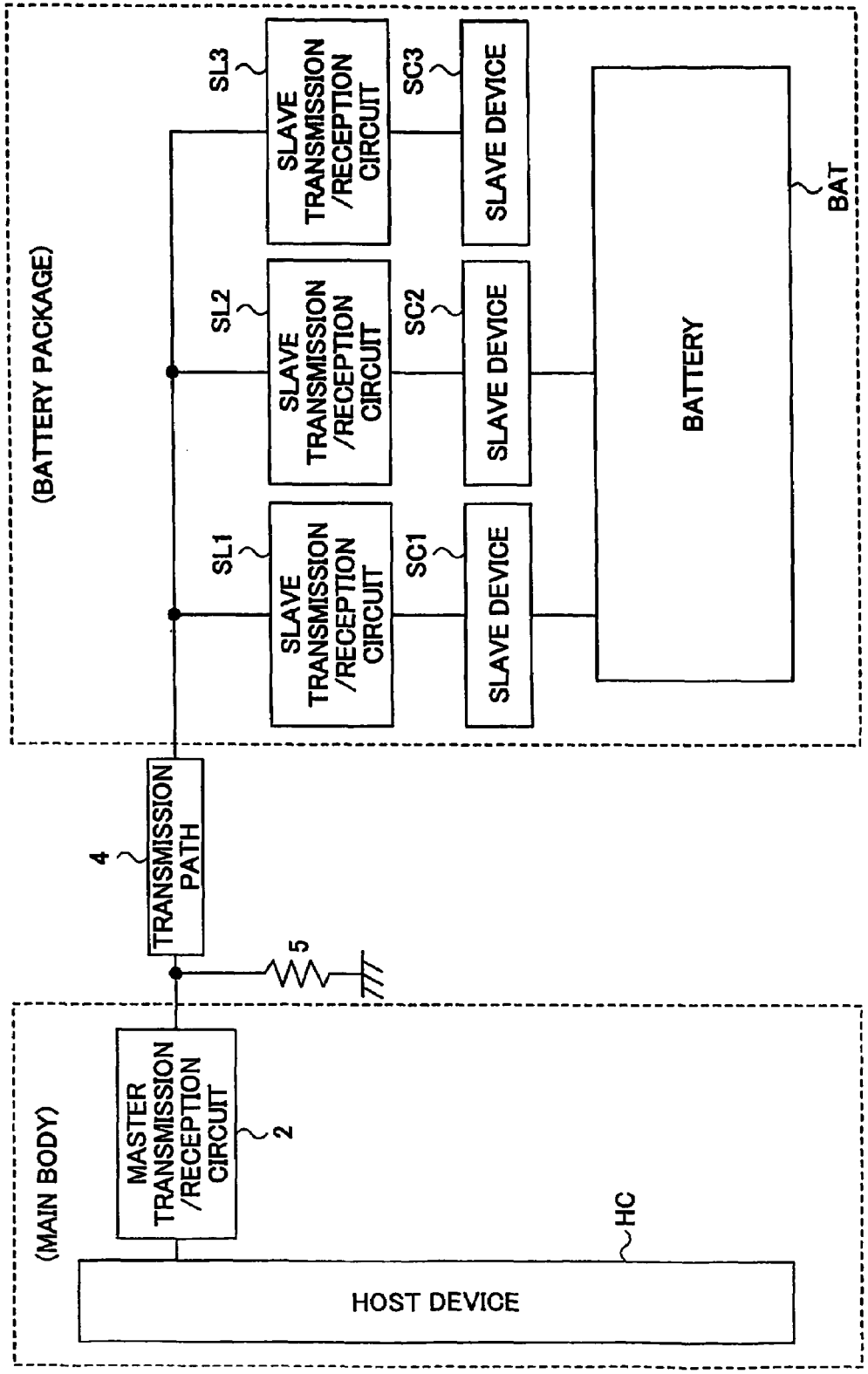
FIG. 3 is a block diagram schematically illustrating a serial communication device in which the slave device is implemented to be a battery package.

Below, preferred embodiments of the present invention are explained with reference to the accompanying drawings.

FIG. 1 is a block diagram schematically illustrating a serial communication device according to an embodiment of the present invention.

In FIG. 1, a serial communication device 1 performs serial communications by half-duplex operations between a host device HC and slave devices SC1 through SCn (where n is an integer greater than zero). The serial communication device 1 includes a master transmission/reception circuit 2 and slave transmission/reception circuits SL1 through SLn.

Here, the master transmission/reception circuit 2 corresponds to the first transmission/reception circuit in claims, and the slave transmission/reception circuits SL1 through SLn correspond to the second transmission/reception circuit in claims.

The master transmission/reception circuit 2 is connected to the host device HC, and the slave transmission/reception circuits SL1 through SLn are connected to the slave devices SC1 through Scn, respectively.

The master transmission/reception circuit 2 and the slave transmission/reception circuits SL1 through SLn are connected with a transmission path 4, which transmits serial signals. In addition, the transmission path 4 is connected to ground through a pull-down resistor 5.

It should be noted that the transmission path 4 can be formed from not only signal lines but also light, supersonic waves or other sounds, or radio frequency (RF) waves.

The slave transmission/reception circuits SL1 through SLn have the same configuration. Below, any one of the slave transmission/reception circuits SL1 through SLn, denoted to be SLk (k=1 to n), is used as an example.

The master transmission/reception circuit 2 includes a master transmission circuit 11 and a master reception circuit 12. The slave transmission/reception circuit SLk includes a slave transmission circuit 13 and a slave reception circuit 14.

The master transmission circuit 11 and the master reception circuit 12, and the slave transmission circuit 13 and the slave reception circuit 14 are connected through the transmission path 4.

When transmitting data from the master transmission/reception circuit 2 to the slave transmission/reception circuit SLk, the master transmission circuit 11 superposes a superposition pulse on a high-level (High) portion of a clock signal TCLK input from the host device HC to write desired data, thereby generating desired serial data signal DATA. The serial data signal DATA is transmitted from the master transmission circuit 11 to the slave transmission/reception circuit SLk through the transmission path 4.

The slave reception circuit 14 extracts data from the serial data signal DATA input through the transmission path 4.

On the other hand, when transmitting data from the slave transmission/reception circuit SLk to the master transmission/reception circuit 2, the slave transmission/reception circuit SLk writes data to the serial data signal DATA input from the master transmission/reception circuit 2 through the transmission path 4. The slave transmission circuit 13 and the slave reception circuit 14 are connected with each other, and the slave transmission circuit 13 superposes a superposition pulse on a low-level (Low) portion of the serial data signal DATA input through the transmission path 4 to write desired data, then the thus obtained serial data signal DATA is transmitted to the master transmission/reception circuit 2 through the transmission path 4.

The master reception circuit 12 extracts data from the serial data signal DATA input through the transmission path 4.

For example, in a mobile cellular phone, the slave devices SC1 through SCn serve as a temperature sensor installed in a battery package, a battery checker for indicating residual electric power of a battery BAT, and a battery identifier for identifying the type of the battery package. The slave devices, such as the temperature sensor and the battery checker, are connected to the battery BAT built in the battery package.

FIG. 2A through FIG. 2E show a timing chart illustrating a communication protocol used by the serial communication device 1 shown in FIG. 1.

As illustrated in FIG. 2A through FIG. 2E, the host device HC uses the serial communication device 1 to transmit a high level signal to the slave devices SC1 through SCn over a certain period, namely, the host device HC performs preamble communications.

Receiving the high level signal continuously, each of the slave devices SC1 through SCn recognizes that a preamble is being transmitted from the host device HC, and starts a preamble preparation period. In this state, after the host device HC transmits one clock pulse at the low level, for example, the host device HC transmits a characteristic ID of the slave devices SC1. After the preamble, each of the slave devices SC1 through SCn receives the one clock pulse at the low level first, next receives the ID, and then determines whether the received ID is in agreement with its own ID.

Assume the slave device SC1 determines that the received ID is in agreement with its own ID, and the other slave devices determine that the received ID is not in agreement with their own IDs. When the slave device SC1 determines that the ID issued by the host device HC is in agreement with its own ID, the slave device SC1 transmits an acknowledge signal ACK to notify the host device HC of the determination result. When the host device HC confirms that the acknowledge signal ACK is transmitted on the transmission path 4, which is formed from one wire, the host device HC determines that the slave device SC1 is on the transmission path 4, and the slave device SC1 is in a state enabling normal communication. Based on this determination result, the host device HC issues a command to execute operations in the slave device SC1.

When receiving the command, the slave device SC1 executes the command. When it is necessary to send back results of the command execution to the host device HC, the slave device SC1 sends back the results of the command execution to the host device HC.

For example, when the command is a read command of reading a register at a specified address, as the results of the command execution, the slave device SC1 sends back the data in the register to the host device HC.

After the host device HC confirms the received data, one processing cycle is completed.

If the host device HC continues communications with the same slave device or other slave devices, a preamble communication for the next communication operation is started.

The one-wire bus communication is frequently used because it enables reduction of the number of terminals of the device, and in turn reduces the cost. For this reason, if the circuits of the slave devices are constructed with general-purpose elements, the cost can be reduced by mass production.

However, with the circuits of the slave device being constructed with general-purpose elements, for example, when the slave device SC1 and the slave device SC2 are used in different systems, the preamble periods of the slave device SC1 and the slave device SC2 required by the systems may be different.

In this way, in order to make the slave devices general-purpose, and use a common method in different systems, in the present embodiment, the preamble period is not fixed, and the same signal is transmitted continuously over a certain period to create a guaranteed preamble state.

In this way, for example, when the slave device SC1 is in a preamble state over a 32-clock-pulse period, the slave device SC2 requires a preamble state over a 20-clock-pulse period, and other slave devices SC3 to SCn require preamble states over a 20-clock-pulse period, if a preamble state over a 36-clock-pulse period is created, all slave devices are in a guaranteed preamble state. Afterward, a low level pulse is transmitted, and all slave devices SC1 through SCn can transfer to an ID detection period simultaneously.

In the one-wire bus communication, if the slave device connected to the one-wire bus is known beforehand, the following method can be tried, that is, issue an ID to select a specified slave device after the preamble communication, and issue a command immediately. This method has an advantage in that the communication time can be saved, but it is not applicable to the situation in which the one-wire bus is opened to the outside, and an unspecified number of devices are optionally connected to the bus as system devices. When an unspecified number of devices are connected to the bus, it is necessary for the host device HC to first confirm the slave device to be accessed.

For this reason, after the preamble communication, and after the host device HC issues the ID, the recognized slave device transmits the acknowledge signal ACK to the host device HC; thereby, the host device HC can confirm that the slave device is connected to the one-wire bus. If the slave device is connected to the one-wire bus as a system device, it is possible to use the slave device to perform operations on the system. If there is no acknowledge signal ACK sent back, the host device HC can confirm that the slave device is not connected to the one-wire bus, and the system is operating without the slave device. This scheme is useful when the slave device is used just as an option.

If the slave device malfunctions when a clock signal and a data signal are transmitted with the one-wire bus, it is necessary to reset the slave device. However, even if the slave device is reset with data, when the slave device malfunctions, data communication may be disabled. In order to avoid such a problem, the slave device is configured such that if the same signal is received continuously over a certain period, the slave device compulsorily sets the internal status of the slave device to the initial values, namely, the slave device performs resetting.

In this way, if a slave device recognized in the initial state of the system cannot send back the acknowledge signal ACK any more during operations, probably some malfunction has occurred in the slave device; for example, the host device HC continuously sends a high level signal for 128 times to initialize all the slave devices connected to the one-wire bus to an established preamble reception preparation state. In this way, the one-wire system is capable of stable operations.

Below, explanations are made of the applications executed during the one-wire communications.

FIG. 3 is a block diagram schematically illustrating a serial communication device in which the slave device is implemented to be a battery package. In FIG. 3, it is assumed that n equals 3.

In FIG. 3, it is assumed that the slave device SC3 has an authentication ID function. The slave device SC1 is a battery checker that checks and indicates residual power of a battery BAT, and the slave device SC2 is a temperature sensor that detects the temperature of the battery BAT. It is assumed that the host device HC first communicates with a device having the authentication ID function as the slave device SC3. In this case, an ID equaling 3 is input to the slave device SC3 after the preamble. When the slave device SC3 determines that this ID after the preamble points to the slave device SC3, the slave device SC3 sends the acknowledge signal ACK on the one-wire transmission path 4. Meanwhile, because the ID after the preamble does not point to the slave device SC1 and the slave device SC2, the slave device SC1 and the slave device SC2 do not send back the acknowledge signal ACK.

When the host device HC confirms that the acknowledge signal ACK is sent back from the slave device SC3, the host device HC can determine that an authentication ID device is in the slave device SC3, and the host device HC starts to communication with the authentication ID device. The host device HC sends specified codes to the authentication ID device of the slave device SC3, through the master transmission/reception circuit 2, the transmission path 4, and the slave transmission/reception circuit SL3.

Receiving the specified codes from the host device HC, the authentication ID device of the slave device SC3 encrypts the codes, and sends back the encrypted codes to the host device HC.

The master transmission/reception circuit 2 sends the encrypted codes received from the slave device SC3 to the host device HC.

The host device HC decrypts the encrypted codes; thereby, the host device HC can authenticate that the authentication ID device in the battery package is a predetermined device.

The same protocol is used to enable communications when the residual power of the battery is reported from the slave device SC1, or the temperature is reported from the slave device SC2.

Authentication of any slave device SCk is performed by using the one-wire transmission path 4. When receiving the clock signal TCLK input from the host device HC, the master transmission/reception circuit 2 detects a start of the clock operations to automatically start the authentication process. The host device HC sends specified signals to the slave device SCk through the serial communication device 1, and the slave device SCk creates an encryption key based on the specified signals, then sends back the encryption key to the host device HC through the serial communication device 1.

Figure 4:
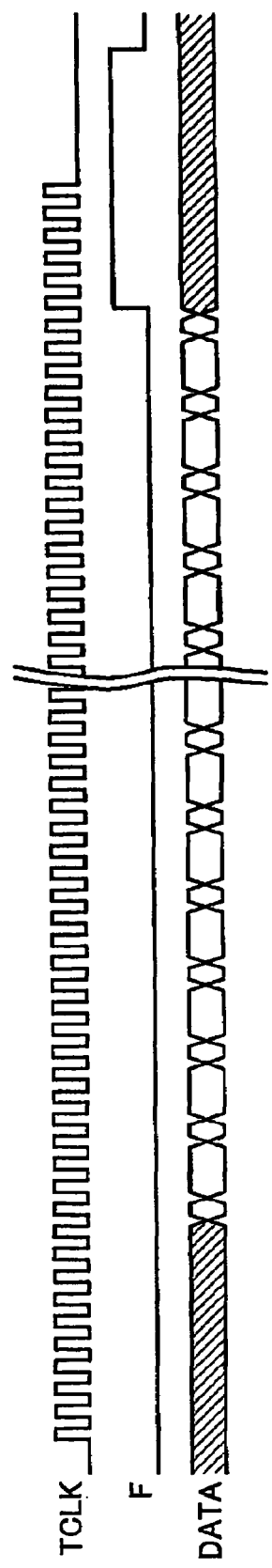
FIG. 4 shows waveforms presenting an example of states of a flag F during the authentication process.

FIG. 4 shows waveforms presenting an example of states of a flag F during the authentication process.

As illustrated in FIG. 4, the host device HC decrypts the signals sent from the slave device SCk, and when the authentication result is in agreement, the host device HC sets an internal flag F to a high level, stops supply of the clock signal TCLK, and resets the master transmission/reception circuit 2; then the authentication sequence is completed.

When it is desired to perform a next authentication sequence, once the host device HC supplies the clock signal TCLK, the authentication process is started automatically.

On the other hand, the host device HC decrypts the signals sent from the slave device sCk, and when the authentication result is not in agreement, the host device HC does not set the internal flag F to the high level, and after a specified time period elapses, the host device HC stops supply of the clock signal TCLK due to the authentication failure. Even in this case, the host device HC resets the master transmission/reception circuit 2, and when a start of authentication operations is detected, the host device HC performs again the authentication operations of the slave device.

Figure 5:
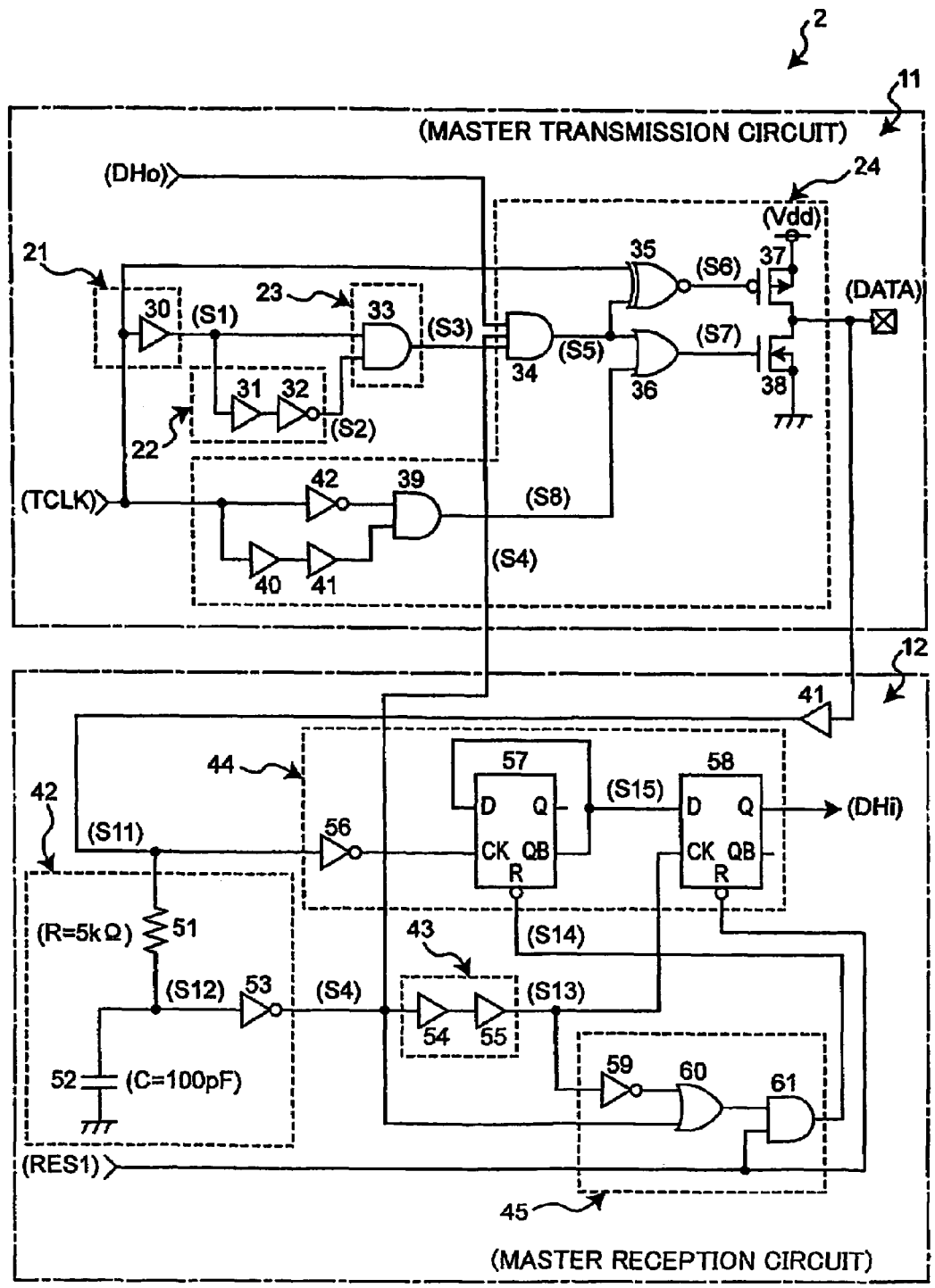
FIG. 5 exemplifies a circuit diagram of the master transmission/reception circuit 2.

FIG. 5 exemplifies a circuit diagram of the master transmission/reception circuit 2.

In FIG. 5, a data signal DHo and a clock signal TCLK are output from the host device HC and input to the master transmission circuit 11. According to the data signal DHo, the master transmission circuit 11 generates the serial data signal DATA and outputs the serial data signal DATA to the transmission path 4. For example, the clock signal TCLK has a frequency twice the output timing of the data signal DHo, and is in synchronization with the data signal DHo.

The master transmission circuit 11 includes a T2 delay circuit 21 that delays the clock signal TCLK by a time period T2 and outputs the delayed signal; a T1 delay circuit 22 that delays the output signal S1 from the T2 delay circuit 21 by a time period T1 and outputs the delayed signal; a pulse generation circuit 23 that generates a pulse signal S3 from the output signal S1 from the T2 delay circuit 21 and the output signal S2 from the T1 delay circuit 22; and an output signal generation circuit 24 that generates the serial data signal DATA corresponding to the data signal DHo from the data signal DHo, the pulse signal S3 from the pulse generation circuit 23, and the clock signal TCLK, then transmits the serial data signal DATA to the transmission path 4.

Here, the master transmission circuit 11, the T2 delay circuit 21, the T1 delay circuit 22, the pulse generation circuit 23, and the output signal generation circuit 24 correspond to the first transmission circuit, the first T2 delay circuit, the first T1 delay circuit, the first superposition pulse generation circuit, and the first output signal generation circuit in claims, respectively.

The T2 delay circuit 21 includes a buffer 30. The clock signal TCLK is input to an input terminal of the buffer 30, and the buffer 30 delays the input clock signal TCLK by the time period T2, then outputs the obtained signal S1 to the T1 delay circuit 22 and the pulse generation circuit 23. The time period T2 is decided by a threshold voltage of the buffer 30.

The T1 delay circuit 22 includes a buffer 31 and an inverter 32, which are connected in series. The buffer 31 and the inverter 32 delay the output signal S1 from the T2 delay circuit 21 by the time period T1, invert the signal level, and output the obtained signal S2 to the pulse generation circuit 23.

The pulse generation circuit 23 includes an AND circuit 33. The output signal S1 from the T2 delay circuit 21 is input to one input terminal of the AND circuit 33, and the output signal S2 from the T1 delay circuit 22 is input to the other input terminal of the AND circuit 33. From an output terminal of the AND circuit 33, the pulse signal S3 is output, which is used to generate a superposition pulse having a low level and a pulse width T1 at a position after the time period T2 elapses from the rising time of the input clock signal TCLK.

The output signal generation circuit 24 includes an AND circuit 34 having three input terminals, an ExNOR (exclusive NOR) circuit 35, an OR circuit 36, a PMOS transistor 37, a NMOS transistor 38, an AND circuit 39, buffers 40, 41, and an inverter 42.

The data signal DHo from the host device, the pulse signal S3 from the AND circuit 33, and a signal S4 from the master reception circuit 12 are input to the three input terminals of the AND circuit 34, respectively.

The clock signal TCLK is input to one input terminal of the ExNOR circuit 35, and an output signal S5 from the AND circuit 34 is input to the other input terminal of the ExNOR circuit 35, and the ExNOR circuit 35 output a signal S6 to a gate of the PMOS transistor 37.

The clock signal TCLK is inverted by the inverter 42 and is then input to one input terminal of the AND circuit 39, and the clock signal TCLK is delayed by the buffers 40, 41, and is input to the other input terminal of the AND circuit 39.

An output signal S8 from the AND circuit 39 is input to one input terminal of the OR circuit 36, and an output signal S5 from the AND circuit 34 is input to the other input terminal of the OR circuit 36.

An output signal S7 from the OR circuit 36 is input to a gate of the NMOS transistor 38, the PMOS transistor 37 and the NMOS transistor 38 are connected in series between a power voltage Vdd and the earth, and the transmission path 4 is connected to a connecting portion of the PMOS transistor 37 and the NMOS transistor 38.

In FIG. 5, the master reception circuit 12 extracts an input data signal DHi from the serial data signal DATA input through the transmission path 1, and outputs the extracted signal to the host device HC as an input data signal DHi.

The master reception circuit 12 includes a buffer 41 that amplifies the serial data signal DATA and outputs the amplified signal; a T4 delay circuit 42 that delays an output signal S11 from the buffer 41 by a time period T4, then inverts the signal level and outputs the resulting signal; an input signal delay circuit 43 that delays the output signal S4 from the T4 delay circuit 42 by a predetermined time period and outputs the obtained signal; a data extraction circuit 44 that extracts a data signal from the output signal S11 of the buffer 41 and outputs the data signal as the input data signal DHi to the host device HC; and an initialization circuit 45 that initializes the data extraction circuit 44.

Here, the master reception circuit 12, the T4 delay circuit 42, the input signal delay circuit 43, and the data extraction circuit 44 correspond to the first reception circuit, the first T4 delay circuit, the first input signal delay circuit, and the first data extraction circuit in claims, respectively.

The T4 delay circuit 42 includes a resistor 51, a condenser 52, and an inverter 53. The condenser 52 is connected between one end of the resistor 51 and ground, and the other end of the resistor 51 is connected to the output terminal of the buffer 41 from which the output signal S11 is issued. An input terminal of the inverter 53 is connected to a connecting portion of the resistor 51 and the condenser 52. The signal from connecting portion of the resistor 51 and the condenser 52 is denoted to be S12.

The input signal delay circuit 43 includes a buffer 54 and a buffer 55 which are connected in series. The output signal S4 from the T4 delay circuit 42 is input to an input terminal of the buffer 54, and a delayed signal S13 is output from an output terminal of the buffer 55.

The data extraction circuit 44 includes an inverter 56 and D flip-flops 57, 58. The inverter 56 inverts the signal S11 and inputs the inverted signal S11 to a clock signal input terminal CK of the D flip-flop 57. In the D flip-flop 57, an inverted output terminal QB is connected to a data input terminal D, and this connection terminal is connected to a data input terminal D of the D flip-flop 58. In the D flip-flop 58, the output signal S13 from the input signal delay circuit 43 is input to the clock signal input terminal CK, and the input data signal DHi is output from an output terminal Q to the host device HC. An output signal S14 from the initialization circuit 45 is input to a reset signal input terminal R of the D flip-flop 57, and a power-on reset signal RES1 from the host device HC is input to a reset signal input terminal R of the D flip-flop 58.

The initialization circuit 45 includes an inverter 59, an OR circuit 60, and an AND circuit 61.

The output signal S13 is inverted by the inverter 59 and is then input to one input terminal of the OR circuit 60, and the output signal S4 is input to the other input terminal of the OR circuit 60.

An output signal from the OR circuit 60 is input to one input terminal of the AND circuit 61, and the power-on reset signal RES1 from the host device HC is input to the other input terminal of the AND circuit 61. The output terminal of the AND circuit 61 is connected to the reset signal input terminal R of the D flip-flop 57.

Figure 6:
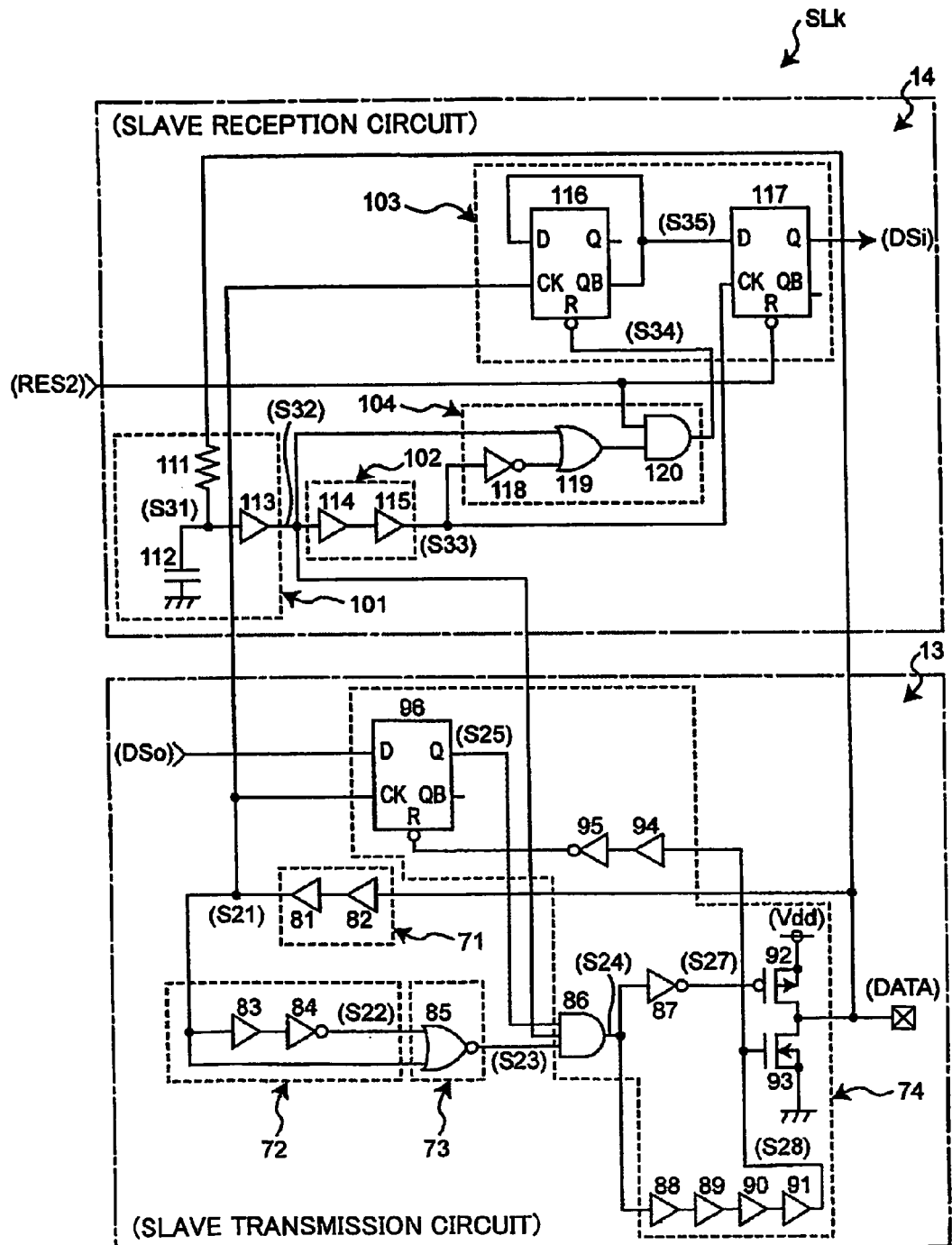
FIG. 6 exemplifies a circuit diagram of the slave transmission/reception circuit SLk. Other slave transmission/reception circuits are the same as the slave transmission/reception circuit SLk.
Figure 7:
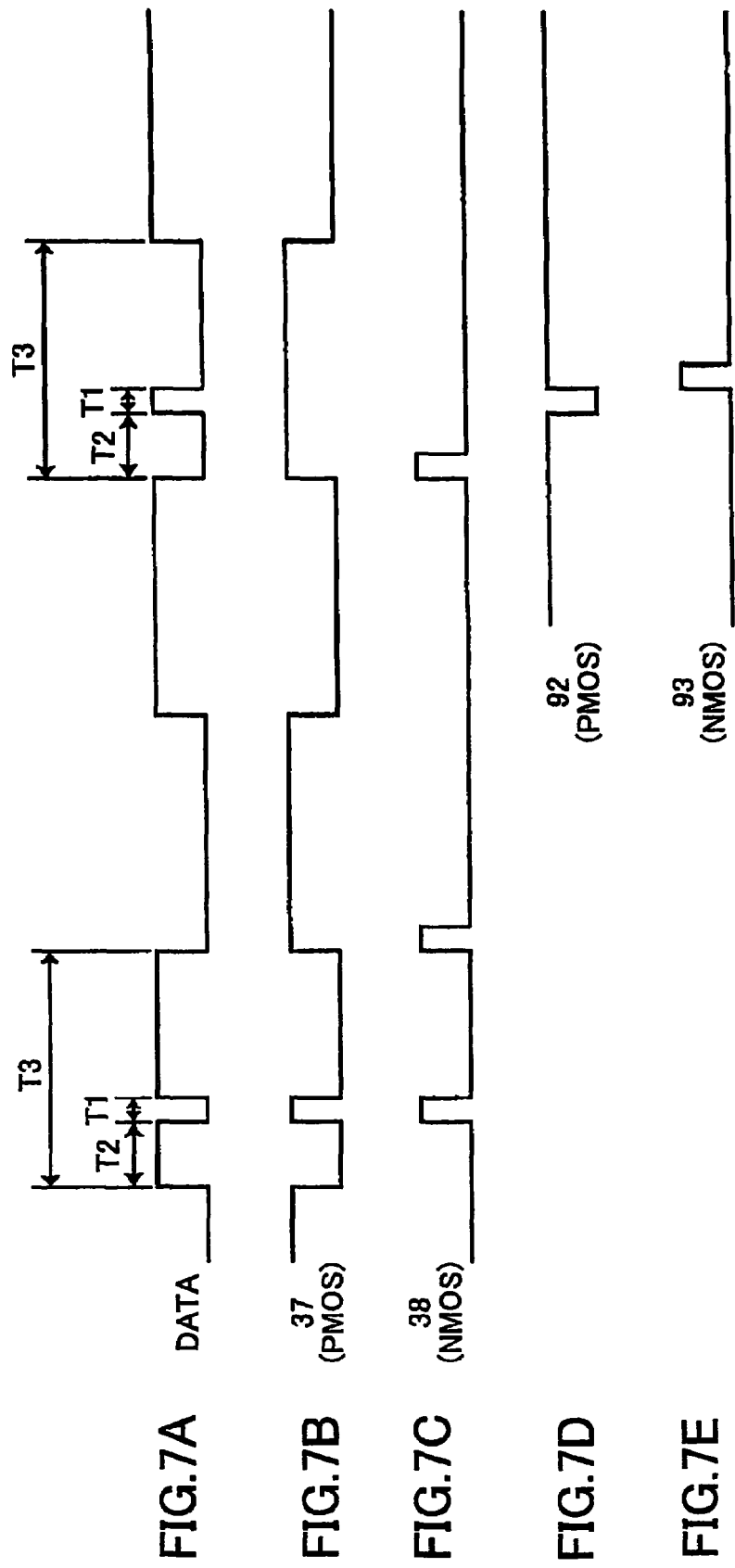
FIG. 7A through FIG. 7E show examples of waveforms in communications in the serial communication device 1.
Figure 8:
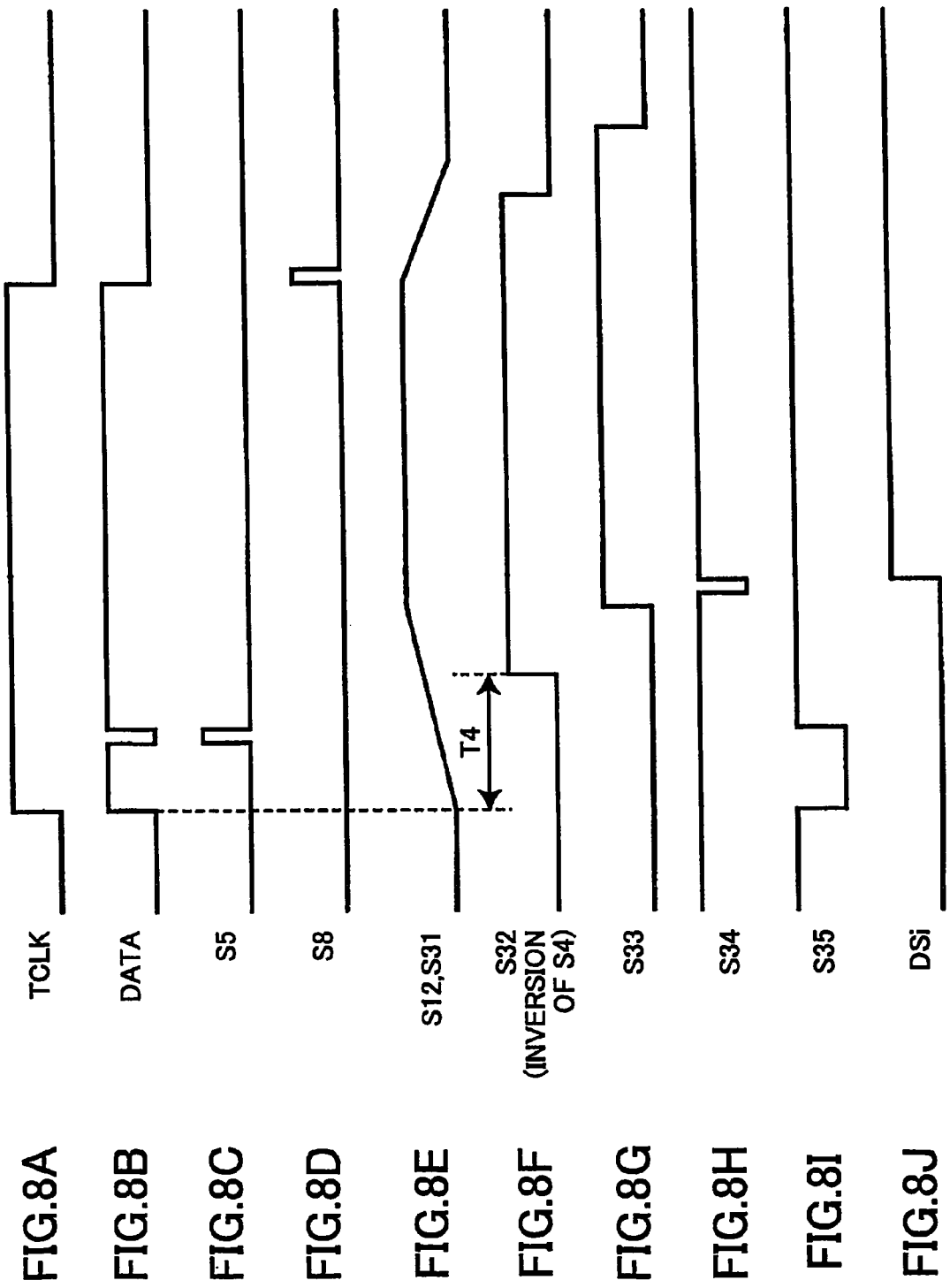
FIG. 8A through FIG. 8J show a timing chart corresponding to the waveforms in FIG. 5 and FIG. 6, illustrating a process in which the master transmission circuit 11 transmits data "1"
Figure 9:
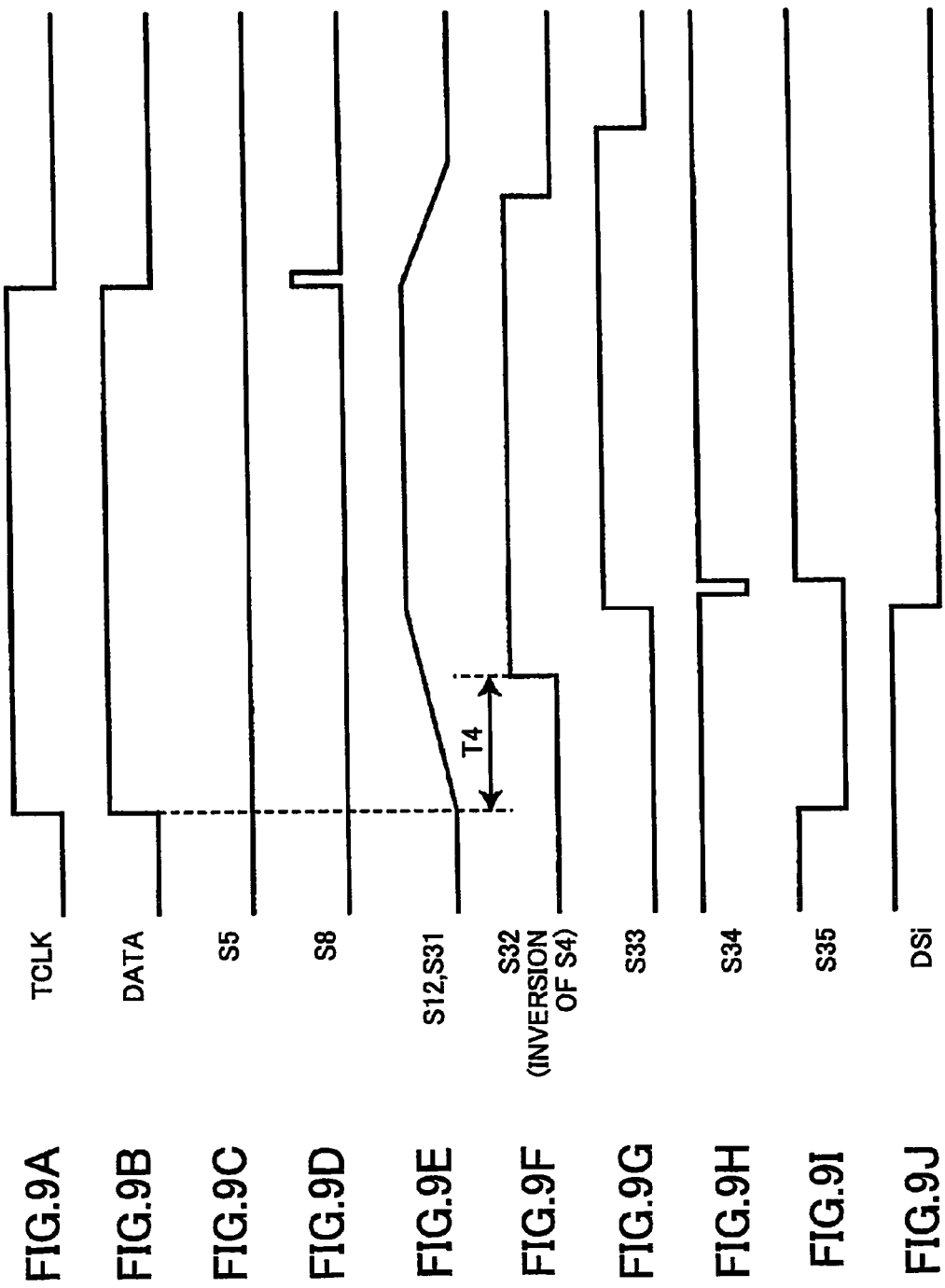
FIG. 9A through FIG. 9J show a timing chart illustrating a process in which the master transmission circuit 11 transmits data "0"

FIG. 6 exemplifies a circuit diagram of the slave transmission/reception circuit SLk. Other slave transmission/reception circuits are the same as the slave transmission/reception circuit SLk.

In FIG. 6, an output data signal DSo from the slave device SCk is input to the slave transmission circuit 13, and the serial data signal DATA, which corresponds to the output data signal DSo, is generated and output to the transmission path 4.

The slave transmission circuit 13 includes a T2 delay circuit 71 that delays the serial data signal DATA by a time period T2 and outputs the obtained signal; a T1 delay circuit 72 that delays the output signal S21 from the T2 delay circuit 71 by a time period T1 and outputs the obtained signal; a pulse generation circuit 73 that generates a pulse signal S23 from the output signal S21 from the T2 delay circuit 71 and the output signal S22 from the T1 delay circuit 72; and an output signal generation circuit 74 that generates the serial data signal DATA corresponding to the output data signal DSo from the output data signal DSo, the output signal S23 from the pulse generation circuit 73, and outputs the serial data signal DATA.

Here, the slave transmission circuit 13, the T2 delay circuit 71, the T1 delay circuit 72, the pulse generation circuit 73, and the output signal generation circuit 74 correspond to the second transmission circuit, the second T2 delay circuit, the second T1 delay circuit, the second pulse generation circuit, and the second output signal generation circuit in claims, respectively.

The T2 delay circuit 71 includes a buffer 81, and a buffer 82, which are connected in series. The serial data signal DATA is input to an input terminal of the buffer 82. The buffer 81 delays the input serial data signal DATA by the time period 12, and outputs the obtained signal S21.

The T1 delay circuit 72 includes a buffer 83 and an inverter 84, which are connected in series. The buffer 83 and the inverter 84 delay the output signal S21 from the T2 delay circuit 71 by the time period T1, invert the signal level, and output the obtained signal S22 to the pulse generation circuit 73.

The pulse generation circuit 73 includes an NOR circuit 85. The output signal S21 from the T2 delay circuit 71 is input to one input terminal of the NOR circuit 85, and the output signal S22 from the T1 delay circuit 72 is input to the other input terminal of the NOR circuit 85. From an output terminal of the NOR circuit 85, the pulse signal S23 is output, which is used to generate a superposition pulse having a high level and a pulse width T1 at a position after the time period T2 elapses from the falling time of the serial data signal DATA.

The output signal generation circuit 74 includes an AND circuit 86 having three input terminals, inverters 87, 95, buffers 88 to 91, 94, a PMOS transistor 92, a NMOS transistor 93, and a D flip-flop 96.

A signal S25 corresponding to the output data signal DSo from the slave device SCk, the signal S23 from the NOR circuit 85, and a signal S32 from the slave reception circuit 14 are input to the three input terminals of the AND circuit 86, respectively.

An output signal S24 from the AND circuit 86 is inverted by the inverter 87, and the inverted signal S27 is input to a gate of the PMOS transistor 92. In addition, the output signal S24 from the AND circuit 86 is delayed by the buffers 88 to 91 which are connected in series, and the delayed signal S28 is input to a gate of the NMOS transistor 93.

The PMOS transistor 92 and the NMOS transistor 93 are connected in series between the power voltage Vdd and ground, and the transmission path 4 is connected to a connecting portion of the PMOS transistor 92 and the NMOS transistor 93.

The signal S28 is input to a reset signal input terminal R of the D flip-flop 96 through the buffer 95 and the inverter 95, which are connected in series.

In the D flip-flop 96, the output data signal DSo from the slave device SCk is input to a data input terminal D, and the output signal S21 from the T2 delay circuit 71 is input to the clock signal input terminal CK. The D flip-flop 96 outputs a signal S25 from an output terminal Q to an input terminal corresponding to the AND circuit 86.

Next, in FIG. 6, the slave reception circuit 14 extracts data from the serial data signal DATA input through the transmission path 4, and outputs the extracted signal to the slave device SCk as an input data signal DSi.

In FIG. 6, the slave reception circuit 14 includes a T4 delay circuit 101 that delays the serial data signal DATA by a time period T4 and outputs the resulting signal, an input signal delay circuit 102 that delays the output signal S32 from the T4 delay circuit 101 by a predetermined time period and outputs the obtained signal, a data extraction circuit 103 that extracts a data signal from the output signal S21 of the T2 delay circuit 71 and outputs the data signal as the input data signal DSi to the slave device sCk, and an initialization circuit 104 that initializes the data extraction circuit 103.

Here, the T4 delay circuit 101, the input signal delay circuit 102, and the data extraction circuit 103 correspond to the second T4 delay circuit, the second input signal delay circuit, and the second data extraction circuit in claims, respectively.

The T4 delay circuit 101 includes a resistor 111, a condenser 112, and an inverter 113. The condenser 112 is connected between one end of the resistor 111 and ground, and the serial data signal DATA is input to the other end of the resistor 111. An input terminal of the buffer 113 is connected to a connecting portion of the resistor 111 and the condenser 112. The signal from connecting portion of the resistor 111 and the condenser 112 is denoted to be S31.

The input signal delay circuit 102 includes a buffer 114 and a buffer 115 which are connected in series. The output signal S32 from the T4 delay circuit 101 is input to an input terminal of the buffer 114, and a delayed signal S33 is output from an output terminal of the buffer 115.

The data extraction circuit 103 includes a D flip-flop 116, and a D flip-flop 117. In the D flip-flop 116, the output signal S21 from the T2 delay circuit 71 is input to the clock signal input terminal CK, an inverted output terminal QB is connected to a data input terminal D, and this connection part carrying signal S35 is connected to the data input terminal D of the D flip-flop 117.

In the D flip-flop 117, the output signal S33 from the input signal delay circuit 102 is input to the clock signal input terminal CK, and an output terminal outputs the input data signal DSi to the slave device SCk. An output signal S34 from the initialization circuit 104 is input to a reset signal input terminal R of the D flip-flop 116, and a power-on reset signal RES1 from a not-illustrated power-on reset circuit is input to a reset signal input terminal R of the D flip-flop 117.

The initialization circuit 104 includes an inverter 118, an OR circuit 119, and an AND circuit 120.

The output signal S33 is inverted by the inverter 118 and is then input to one input terminal of the OR circuit 119, and the output signal S32 from the T4 delay circuit 101 is input to the other input terminal of the OR circuit 119.

An output signal from the OR circuit 119 is input to one input terminal of the AND circuit 120, and the power-on reset signal RES2 is input to the other input terminal of the AND circuit 120. The output terminal of the AND circuit 120 is connected to the reset signal input terminal R of the D flip-flop 116.

Below, a description is made of a communication method of the serial communication device 1 having the above configuration.

In the serial communication device 1, a superposition pulse signal is superposed on the clock signal TCLK, and the value of signal data is expressed in connection with presence or absence of the superposition pulse signal.

FIG. 7A through FIG. 7E show examples of waveforms in communications in the serial communication device 1.

Signal communication in the one-wire communications includes supplying the clock signal TCLK from the master transmission/reception circuit 2, transferring data from the master transmission/reception circuit 2 to the slave transmission/reception circuit SLk, and transferring data from the slave transmission/reception circuit SLk to the master transmission/reception circuit 2.

In the serial communication device 1, the master transmission/reception circuit 2 or the slave transmission/reception circuit SLk inserts data signals into the clock signal TCLK supplied from the host device HC for communication.

When transmitting data from the master transmission/reception circuit 2 to the slave transmission/reception circuit SLk, the high-level (High) portion of the clock signal TCLK is used. When transmitting data from the slave transmission/reception circuit SLk to the master transmission/reception circuit 2, the low-level (Low) portion of the clock signal TCLK is used.

When the master transmission/reception circuit 2 transmits data "1" to the slave transmission/reception circuit SLk, a low-level superposition pulse having a pulse width T1 is inserted into the clock signal TCLK, after the time period T2 elapses from the rising time of the clock signal TCLK, when the clock signal TCLK is at the high level.

When the master transmission/reception circuit 2 transmits data "0" to the slave transmission/reception circuit SLk, the low-level superposition pulse is not inserted into the clock signal TCLK when the clock signal TCLK is at the high level.

Similarly, when the slave transmission/reception circuit SLk transmits data "1" to the master transmission/reception circuit 2, a high-level superposition pulse having a pulse width T1 is inserted into the clock signal TCLK, after the time period T2 elapses from the falling time of the clock signal TCLK, when the clock signal TCLK is at the low level.

When the slave transmission/reception circuit SLk transmits data "0" to the master transmission/reception circuit 2, the high-level superposition pulse is not inserted into the clock signal TCLK when the clock signal TCLK is at the low level.

Here, time T1, T2, T3, and T4 satisfy $$T1<T2<T4<T3, \text{ and } (T1+T2) \leq T4<T3.$$

In this way, the serial communication device 1 is able to transmit data through the transmission path 4.

The master transmission/reception circuit 2 and the slave transmission/reception circuit SLk output signals to the transmission path 4, which is formed from one signal line. If the master transmission/reception circuit 2 and the slave transmission/reception circuit SLk output signals to the transmission path 4 at the same time, the corresponding current becomes too large, and this may cause malfunction of the device.

In order to avoid such a problem, when the master transmission/reception circuit 2 outputs signals to the transmission path 4, the output terminal of the slave transmission/reception circuit SLk is set to be in a high impedance state constantly so that the slave transmission/reception circuit SLk does not output signals to the transmission path 4. Meanwhile, when the slave transmission/reception circuit SLk outputs signals to the transmission path 4, the output terminal of the master transmission/reception circuit 2 is set to be in a high impedance state constantly so that the master transmission/reception circuit 2 does not output signals to the transmission path 4.

Here, the transmission path 4 is pulled down by a pull-down resistance 5. The master transmission/reception circuit 2 always outputs signals when the clock signal TCLK is at the high level. When the master transmission/reception circuit 2 transmits data "1" to the slave transmission/reception circuit SLk, that is, when the low-level superposition pulse is inserted when the clock signal TCLK is at the high level, because the master transmission/reception circuit 2 inserts the low-level superposition pulse into the high level portion of the clock signal TCLK, the master transmission/reception circuit 2 constantly drives the transmission path 4 (that is, the master transmission/reception circuit 2 outputs signals to the transmission path 4); hence, the master transmission/reception circuit 2 and the slave transmission/reception circuit SLk do not drive the transmission path 4 (that is, output signals to the transmission path 4) at the same time.

In addition, when the master transmission/reception circuit 2 transmits data "1" to the slave transmission/reception circuit SLk, the transmission path 4 is pulled down by the pull-down resistance 5, and the master transmission/reception circuit 2 does not drive the transmission path 4. Due to this, even when the slave transmission/reception circuit SLk inserts a high-level superposition pulse into a low-level portion of the clock signal TCLK, the master transmission/reception circuit 2 and the slave transmission/reception circuit SLk do not drive the transmission path 4 at the same time.

When the master transmission/reception circuit 2 inserts the low-level superposition pulse into the high-level portion of the clock signal TCLK, because the transmission path 4 is being driven constantly, it is possible to change the state of the transmission path 4 sharply.

However, when the output terminal of the master transmission/reception circuit 2 is set to be in a high impedance state constantly, and it is attempted to set the transmission path 4 to the low level only by the pull-down resistance 5, if the pull-down resistance 5 is not sufficiently small, the rising time becomes smooth. Meanwhile, if the pull-down resistance 5 is too small, when the master transmission/reception circuit 2 sets the transmission path 4 to the high level, current flows through the pull-down resistance 5, and power consumption increases.

In order to avoid this problem, when the transmission path 4 is at the low level, the master transmission/reception circuit 2 turns on the NMOS transistor 38 for a short time period, to set the transmission path 4 to be the low level; as a result, a sharp waveform is obtainable.

Similarly, when the slave transmission/reception circuit SLk inserts the high-level superposition pulse into the low-level portion of the clock signal TCLK, although it is easy to allow the transmission path 4 to transit to the high level rapidly, by only turning off the PMOS transistor 92, as the falling time of the signal levels on the transmission path 4 is only affected by current leakage due to the pull down resistance 5, the falling time becomes smooth.

In order to avoid this problem, when the slave transmission/reception circuit SLk turns off the PMOS transistor 92, the NMOS transistor 93 is turned on for a short time period. Due to this, it is possible to generate a sharp waveform and perform high speed operations. In addition, it is possible to increase the value of the pull down resistance 5, and decrease excessive current consumption on the transmission path 4.

In FIG. 5, when the master transmission/reception circuit 2 transmits data "1" to the slave transmission/reception circuit SLk, the data signal DHo is set to a high level. In this state, if the clock signal TCLK is at the low level, accordingly the signal S5 is at the low level. Since the clock signal TCLK is input and the input terminals of the ExNOR circuit 35 become {1, 0} at the rising time of the clock signal TCLK under this state, the signal S6 turns to be the low level, the PMOS transistor 37 is turned on, and the serial data signal DATA turns to be the high level.

After that, the clock signal TCLK is delayed by the buffer 30 by the time period T2, resulting in the high level signal S1. From the signal S1 and the signal S2, which the signal S1 delayed by the buffer 31 and the inverter 32 by the time period T1, the AND circuit 33 generates a superposition pulse, which has a pulse width T1. The superposition pulse propagates in the AND circuit 34, and within the period of the superposition pulse, the PMOS transistor 37 is turned off, and the NMOS transistor 38 is turned on. Due to this, a low-level superposition pulse is inserted into the serial data signal DATA, when the clock signal TCLK is at the high level.

Next, when the master transmission/reception circuit 2 transmits data "0" to the slave transmission/reception circuit SLk, the data signal DHo is constantly at the low level; hence, the signal S5 from the AND circuit 34 is fixed at the low level, and in the serial data signal DATA, there is no low-level superposition pulse generated when the clock signal TCLK is at the high level.

When the clock signal TCLK turns to the low level, since the PMOS transistor 37 is turned off, the serial data signal DATA declines slowly due to the pull down resistance 5. During signal transmission, the slave transmission/reception circuit SLk is required to generate a pulse with a specified time period from the falling time of the clock signal TCLK. However, if the falling edge of the clock signal TCLK is smoothed, sometimes, the slave transmission/reception circuit SLk may fail to generate pulses; thus, it is required that the falling edge of the clock signal TCLK to be sharp.

The AND circuit 39, buffers 40, 41, and the inverter 42 constitute the circuit for generating pulses at the falling time of the clock signal TCLK. When the clock signal TCLK goes down, a high-level pulse signal is output to the OR circuit 36.

Upon receiving the high-level pulse signal from the AND circuit 39, the OR circuit 36 turns on the NMOS transistor 38, and within the high-level period of the pulse. Due to this, the transmission path 4 quickly drops to the low level, and in the serial data signal DATA output from the master transmission/reception circuit 2, both the rising edge and the falling edge are sharp.

Next, a description is made of data transmission from the slave transmission/reception circuit SLk.

The master transmission/reception circuit 2 supplies the slave transmission/reception circuit SLk shown in FIG. 6 with the serial data signal DATA through the transmission path 4.

The serial data signal DATA is delayed by the buffers 81, 82 of the T2 delay circuit 71 by the time period T2, and is output as the signal S21.

The signal S21 is further delayed and inverted by the buffer 83 and the inverter 84, and then, the NOR circuit 85 outputs the signal S23 after the time period T2 elapses from the falling time of the clock signal TCLK as the superposition pulse having a pulse width T1. The signal S23 is input to a corresponding input terminal of the AND circuit 86.

The output data signal DSo from the slave device SCk is latched for a while at the rising time of the signal S21 which is input to the clock signal input terminal CK of the D flip-flop 96. The resistor 111, the condenser 112, and the inverter 113 of the T4 delay circuit 101 delay the clock signal TCLK input from the transmission path 4 by a time period T4, and generate the signal S32. The signal S32 is also input to a corresponding input terminal of the AND circuit 86.

When the superposition pulse having a pulse width T1 from the NOR circuit 85 is input to the AND circuit 86 after the time period T2 elapses from the falling time of the clock signal TCLK, and when the output data signal DSo is at the high level, and within the time period T4 from the falling time of the clock signal TCLK, the AND circuit 86 outputs the signal S23 from the NOR circuit 85 as the signal S24. Once the signal S24 is generated, the PMOS transistor 92 is turned on, and the PMOS transistor 92 drives the transmission path 4 to the high level. When the signal S24 begins to go down after time T1 elapses, the PMOS transistor 92 is turned off, and the transmission path 4 is in the high impedance state, hence the level of the signal S24 decreases to the low level slowly due to the pull-down resistance 5.

However, this mechanism is not suitable for high speed operations. Hence, the signal S24 from the AND circuit 86 is delayed by the buffers 88 to 91, and is input to the gate of the NMOS transistor 93. The signal S28 delayed by the buffers 88 to 91 turns on the NMOS transistor 93 after the PMOS transistor 92 is turned off, thereby causing the transmission path 4 to quickly to drop to the low level. Since the signal S28 is a pulse signal, after the transmission path 4 is at the low level, the NMOS transistor 93 is turned off and becomes the high impedance state, but the transmission path 4 is fixed to the low level by the pull-down resistance 5.

Next, a description is made of a process in which the slave transmission/reception circuit SLk receives signals transmitted from the master transmission/reception circuit 2.

When the master transmission circuit 11 outputs the serial data signal DATA to the transmission path 4, the slave reception circuit 14 delays the serial data signal DATA transmitted from the transmission path 4 with the T2 delay circuit 71, and generates the signal S21. The output signal S21 from the T2 delay circuit 71 is input to the clock signal input terminal CK of the D flip-flop 96.

When the master transmission circuit 11 outputs the serial data signal DATA representing "1" to the transmission path 4, a narrow low-level superposition pulse is inserted after the rising time of the serial data signal DATA; therefore, both of the rising edge of the serial data signal DATA and the rising edge of the low-level superposition pulse having a pulse width of T1 are available.

Since the D flip-flop 96 is configured to invert the output signal at the rising time of the signal input to the clock signal input terminal CK, if the D flip-flop 96 receives the rising edge of the signal input to the clock signal input terminal CK twice, the output signal is inverted twice and is returned to the original level state.

The serial data signal DATA coming from the transmission path is delayed by the T4 delay circuit 101 by a time period T4, is further delayed by the input signal delay circuit 102, and is input to the clock signal input terminal CK of the D flip-flop 117.

The signal input to the data input terminal D of the D flip-flop 117 is an inverted output signal from the D flip-flop 116, and the inverted output signal from the D flip-flop 116 is at the low level, in other words, when detecting twice the rising edge of the signal S21 input to the clock signal input terminal CK of the D flip-flop 116, the high level data input signal DSi is output in response to the signal reception.

When the master transmission circuit 11 does not output the superposition pulse to the transmission path 4, that is, when the master transmission circuit 11 outputs the serial data signal DATA representing "0" to the transmission path 4, since a rising edge of a signal level is supplied to the clock signal input terminal CK of the D flip-flop 116 only once, the inverted output signal from the D flip-flop 116 is at the low level. Hence, the D flip-flop 117 outputs the data input signal DSi at the low level. Because the D flip-flop 116 is a toggle, once the initial state of the signal level of the inverted output signal is inverted, all the subsequent data input signals DSi may be inverted, too. In order to avoid such a danger, the D flip-flop 116 is constantly reset by the initialization circuit 104 after supplying data to the D flip-flop 117, so as to compensate for the initial state.

The serial data signal DATA is delayed by the T4 delay circuit 101 by the time period T4, and outputs the signal S32. The signal S32 is further delayed by the input signal delay circuit 102 and becomes the signal S33. The signal S33 is input to the clock signal input terminal CK of the D flip-flop 117, and is used for transferring the output signal from the D flip-flop 116.

Further, the initialization circuit 104 generates a reset pulse signal S34 from the signal S33, and input the reset pulse signal S34 to the reset signal input terminal R of the D flip-flop 116. Due to this, after transferring data to the D flip-flop 117, the D flip-flop 116 is reset by the initialization circuit 104, so as to maintain the initial state.

FIG. 8A through FIG. 8J show a timing chart corresponding to the waveforms in FIG. 5 and FIG. 6, illustrating a process in which the master transmission circuit 11 transmits data "1".

As illustrated in FIG. 8A through FIG. 8J, the inverted output signal S35 from the D flip-flop 116 is at the high level initially because of the reset pulse signal S34 from the initialization circuit 104.

The signal S21 input to the clock signal input terminal CK of the D flip-flop 116 is generated when the serial data signal DATA passes through the T2 delay circuit 71. Hence, the inverted output signal S35 from the D flip-flop 116 is inverted at the rising time of the signal level of the serial data signal DATA. When data "1" is included in the serial data signal DATA, the superposition pulse having a pulse width T1 is inserted after the time period T2 elapses from the rising time of the serial data signal DATA.

For this reason, the inverted output signal S35 from the D flip-flop 116 is inverted again at the rising time of the superposition pulse, thus the inverted output signal S35 from the D flip-flop 116 returns to the high level.

After that, at the rising time of the signal S33, which is delayed at the rising time of the serial data signal DATA, the D flip-flop 117 latches the inverted output signal S35 from the D flip-flop 116 to propagate the data "1" from the master transmission circuit 11.

FIG. 9A through FIG. 9J show a timing chart illustrating a process in which the master transmission circuit 11 transmits data "0".

As illustrated in FIG. 9A through FIG. 9J, when the master transmission circuit 11 transmits data "0", the low-level superposition pulse is not inserted when the serial data signal DATA is at the high level. Due to this, the inverted output signal S35 from the D flip-flop 116 is inverted at the rising time of the signal level of the serial data signal DATA and turned to the low level. In this state, at the rising time of the signal S33, which is generated after the serial data signal DATA is delayed, the D flip-flop 117 latches the low level of the signal S35 so as to propagate the data "0" from the master transmission circuit 11.

Under this state, if the rising edge of the next serial data signal DATA is received with the inverted output signal S35 from the D flip-flop 116 being at the low level, the data from the master transmission circuit 11 cannot be propagated correctly. Due to this, after the D flip-flop 117 latches the low level of the signal S35, the reset signal S34 is generated, and the inverted output signal S35 from the D flip-flop 116 is reset to the initial high level. In doing so, in each cycle, the serial data signal DATA from the master transmission circuit 11 can be propagated correctly.

Next, a description is made of a process in which the master transmission/reception circuit 2 receives signals transmitted from the slave transmission/reception circuit SLk.

When the slave transmission/reception circuit SLk transmits data to the master transmission/reception circuit 2, the serial data signal DATA from the master transmission/reception circuit 2 is used as the clock signal. After the falling edge of the serial data signal DATA corresponding to the falling edge of the clock signal TCLK is detected, a high-level pulse is generated.

FIG. 10A through FIG. 10M show a timing chart illustrating a process in which the slave transmission/reception circuit SLk transmits data "1".

As illustrated in FIG. 10A through FIG. 10M, when the slave transmission/reception circuit SLk transmits data "1" to the master transmission/reception circuit 2, a high-level superposition pulse is inserted when the clock signal TCLK is at the low level.

FIG. 11A through FIG. 11M show a timing chart illustrating a process in which the slave transmission/reception circuit SLk transmits data "0".

As illustrated in FIG. 11A through FIG. 11M, when the slave transmission/reception circuit SLk transmits data "0" to the master transmission/reception circuit 2, the high-level superposition pulse is not inserted when the serial data signal DATA is at the low level, which corresponds to the low level of the clock signal TCLK.

When the slave transmission/reception circuit SLk transmits data to the master transmission/reception circuit 2, the high-level superposition pulse is inserted when the transmission path 4 is at the low level. However, in this state, because the master transmission/reception circuit 2 does not drive the transmission path 4, in other words, the transmission path 4 is in the high impedance state, in which both the PMOS transistor 37 and the NMOS transistor 38 are turned off, data conflict does not occur.

Figure 10:
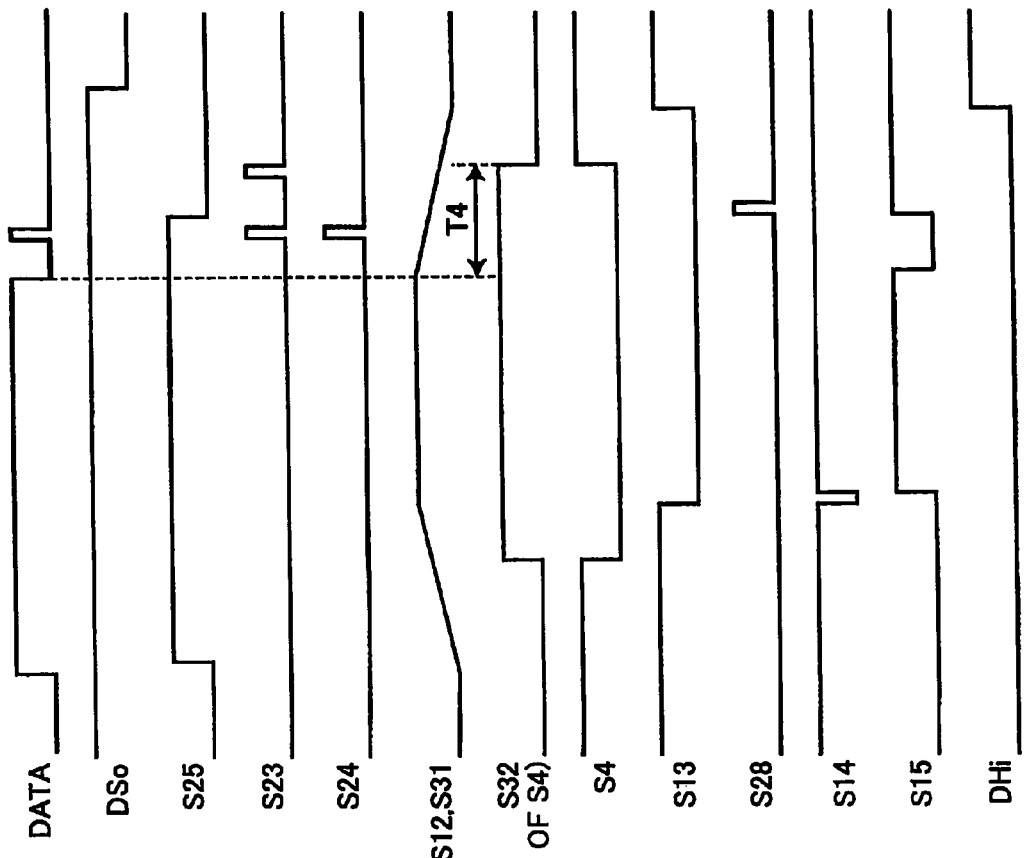
FIG. 10A through FIG. 10M show a timing chart illustrating a process in which the slave transmission/reception circuit SLk transmits data "1"
Figure 11:
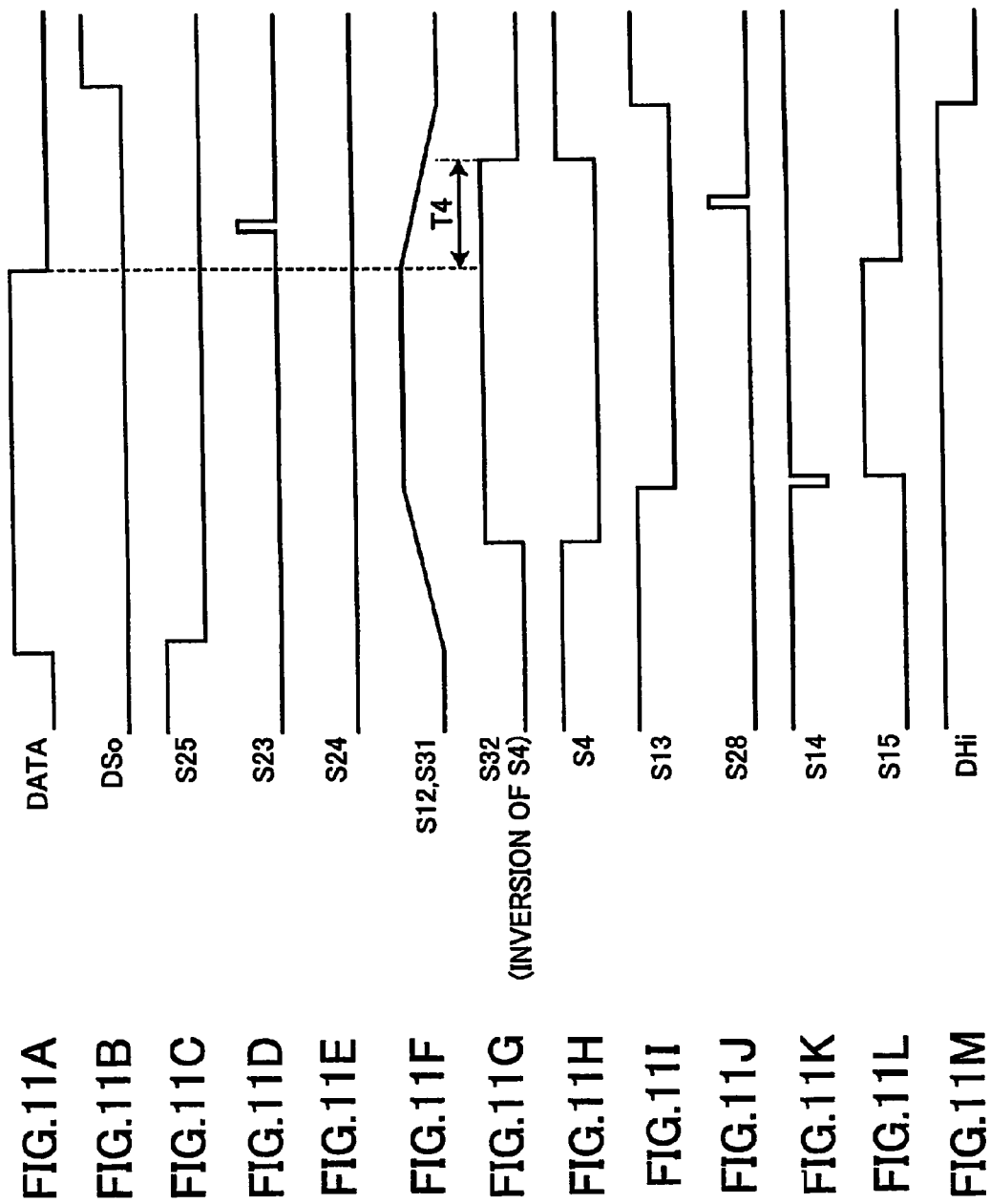
FIG. 11A through FIG. 11M show a timing chart illustrating a process in which the slave transmission/reception circuit SLk transmits data "0"

In FIG. 10, the output data signal DSo is latched in the D flip-flop 96 at the rising time of the serial data signal DATA. This is for the purpose of preventing the slave transmission/reception circuit SLk from starting pulse transmission again erroneously with the falling edge of the superposition pulse as a trigger when the superposition pulse is inserted into the serial data signal DATA in the slave transmission/reception circuit SLk.

When the output data signal DSo is at the high level, a high level signal is latched in the D flip-flop 96 at the rising time of the serial data signal DATA, and the output signal S25 of the D flip-flop 96 turns to the high level. After the time period T2 elapses from the falling time of the serial data signal DATA, the superposition pulse having a pulse width T1 is output from the NOR circuit 85.

The signal S25 corresponding to the output data signal DSo from the slave device SCk, the superposition pulse signal S23 output from the NOR circuit 85, and the signal S32 which is obtained by delaying the serial data signal DATA by the time T4 are input to the corresponding input terminals of the AND circuit 86.

When the serial data signal DATA goes down to the low level, if the signal S25 of the D flip-flop 96 is at the low level, the PMOS transistor 37 is turned on, and a high level pulse is output to the transmission path 4. This pulse goes to the low level after the time period T1, and although the PMOS transistor 37 is turned off, the voltage on the transmission path 4 decreases slowly-due to the pull-down resistance 5. However, this condition prevents the transmission speed from being increased, and may cause malfunction of the device.

In order to avoid this problem, when the slave transmission circuit 13 turns off the PMOS transistor 92, the NMOS transistor 93 is turned on for a short time period. Due to this, it is possible to generate a signal having a sharp falling edge on the transmission path 4. The signal, which is obtained by delaying the output signal from the AND circuit 86 with the buffers 88 to 91, is input to the gate of the NMOS transistor 93.

Here, even when the signals on the transmission path 4 drops to the low level, under such a condition, the slave transmission/reception circuit SLk may detect a falling edge of the superposition pulse, which is inserted when the serial data signal DATA is at the low level, and generate a pulse, causing oscillation in which the above operations are repeatedly performed.

In order to avoid the oscillation, when the NMOS transistor 93 is turned on to cause signals on the transmission path 4 to go to the low level, the signal 28, which is input to the gate of the NMOS transistor 93, is used to reset the D flip-flop 96 to set the output signal S25 to the low level. In doing so, it is possible to prevent the slave transmission/reception circuit SLk from successively outputting signals. As illustrated in FIG. 10A through FIG. 10M, the falling edge of the signal on the transmission path 4 is detected, and two pulses are generated in the signal S23. The first pulse is generated in order to transmit data "1". When the second pulse is generated, since the D flip-flop 96 is reset, and the output signal S25 is at the low level, there is no output signal from the AND circuit 86, and the aforesaid oscillation is preventable.

Next, a description is made of a process in which the master transmission/reception circuit 2 receives signals transmitted from the slave transmission/reception circuit SLk.

When extracting data from the received signals, the master transmission/reception circuit 2 uses the signal S4, which is obtained by delaying the signal on the transmission path 4 by the time period T4, and the signal S13, which is obtained by delaying the signal S4 in the input signal delay circuit 43. With the T4 delay circuit 42, the signal S12 decreases slowly at the falling time of the signal on the transmission path 4.

As shown in FIG. 10A through FIG. 10M, after the time period T4 elapses, the signal S12 exceeds the threshold value of the inverter 53, and the output signal S4 from the inverter 53 is inverted.

Similar to the slave transmission/reception circuit SLk, the master transmission/reception circuit 2 supplies the serial data signal DATA on the transmission path to the D flip-flop 57 as the clock signal, but in the master reception circuit 12, it is the signal inverted by the inverter 56 that is supplied to the D flip-flop 57.

In the D flip-flop 57, a signal output from the inverted output terminal QB is input to the data input terminal D to toggle the internal state at the rising time of the signal input to the clock signal input terminal CK. In the initial state of the D flip-flop 57, an inverted output signal S15 is inverted to a high level by the signal S14, which is input to the reset signal input terminal R of the D flip-flop 57. In this state, when the D flip-flop 57 detects a falling edge of the serial data signal DATA, the inverted output signal S15 is inverted. After that, when a high-level superposition pulse from the slave transmission/reception circuit SLk is inserted into the serial data signal DATA, the D flip-flop 57 inverts the inverted output signal S15 again, and the inverted output signal S15 turns to the high level. Due to the signal S13, which is the serial data signal DATA delayed in the T4 delay circuit 42 and further delayed in the input signal delay circuit 43, the inverted output signal S15 of the D flip-flop 57 is latched in the D flip-flop 58.

In this way, from the D flip-flop 58, the data "1" from the slave transmission/reception circuit SLk is transmitted to the host device HC. Because the D flip-flop 57 is a toggle, if the initial state is not stable, the signals cannot be correctly propagated. In order to avoid such a problem, once the D flip-flop 57 detects a rising edge of the serial data signal DATA, the D flip-flop 57 is reset by the initialization circuit 45. In doing so, the initial state is stable in each cycle. As for the pulse signal for this reset operation, by performing a logical OR operation of a signal obtained by inverting the signal S13 with the inverter 59, and the signal S4 in the OR circuit 60, the reset pulse S14 is generated after a certain time period elapses from the rising time of the serial data signal DATA. In this way, because the condition of the D flip-flop 57 is initialized at the rising time of the serial data signal DATA, and the data from the slave transmission/reception circuit SLk is received at the falling time of the serial data signal DATA, the condition of the D flip-flop 57 can be constantly stabilized.

As shown in FIG. 11A through FIG. 11M, when the master transmission/reception circuit 2 receives data "0" from the slave transmission/reception circuit SLk, in the slave transmission/reception circuit SLk, a low level portion of the output data signal DSo is latched in the D flip-flop 96 at the rising time of the serial data signal DATA to set the signal S25 to the low level. Afterward, when the D flip-flop 57 detects a falling edge of the serial data signal DATA, the NOR circuit 85 outputs a pulse having a pulse width T1, and the signal S25 is at the low level. Hence, the pulse output from the NOR circuit 85 is not output from the AND circuit 86.

Under this state, in the master reception circuit 12, the D flip-flop 57 toggles to set the inverted output signal S15 to the low level at the falling time of the serial data signal DATA. Because there is no pulse indicating the data "1" from the slave transmission/reception circuit SLk in the serial data signal DATA, the inverted output signal S15 at the low level is latched in the D flip-flop 58 at the rising time of the signal S13. In doing so, the data "0" is transmitted from the slave transmission/reception circuit SLk to the master transmission/reception circuit 2.

After that, the reset signal is generated in the signal S14 at the rising time of the serial data signal DATA, and the D flip-flop 57 is reset to the initial state, so as to correctly receive data from the slave transmission/reception circuit SLk at the next falling time of the serial data signal DATA.

In the above descriptions, it is exemplified that the transmission path 4 is pulled down by the pull down resistance 5. However, the present invention is also applicable to the case in which the transmission path 4 is pulled up by a pull-up resistance 7.

Figure 12:
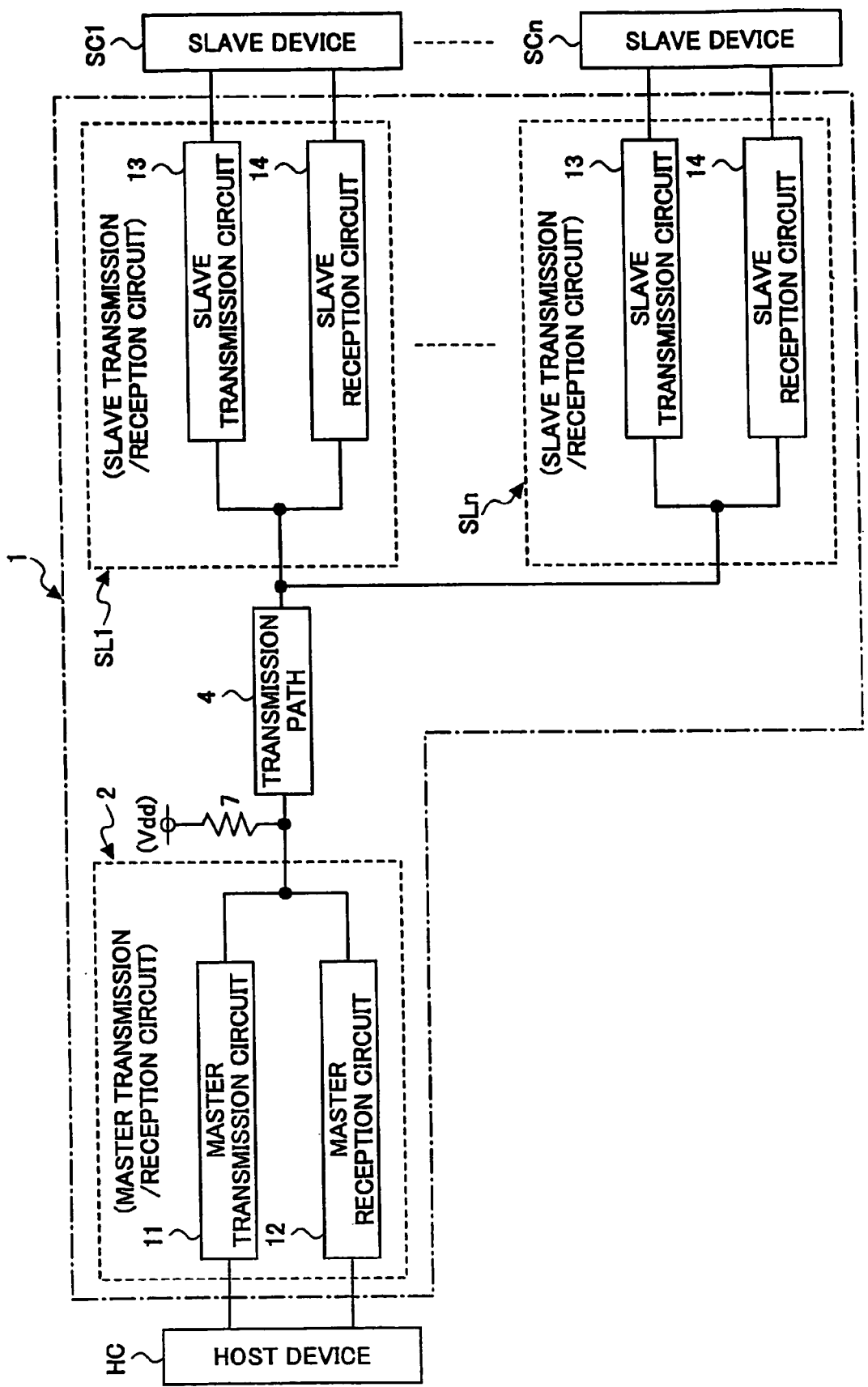
FIG. 12 is a block diagram schematically illustrating another example of the serial communication device according to an embodiment of the present invention.

FIG. 12 is a block diagram schematically illustrating another example of the serial communication device according to an embodiment of the present invention.

Figure 13:
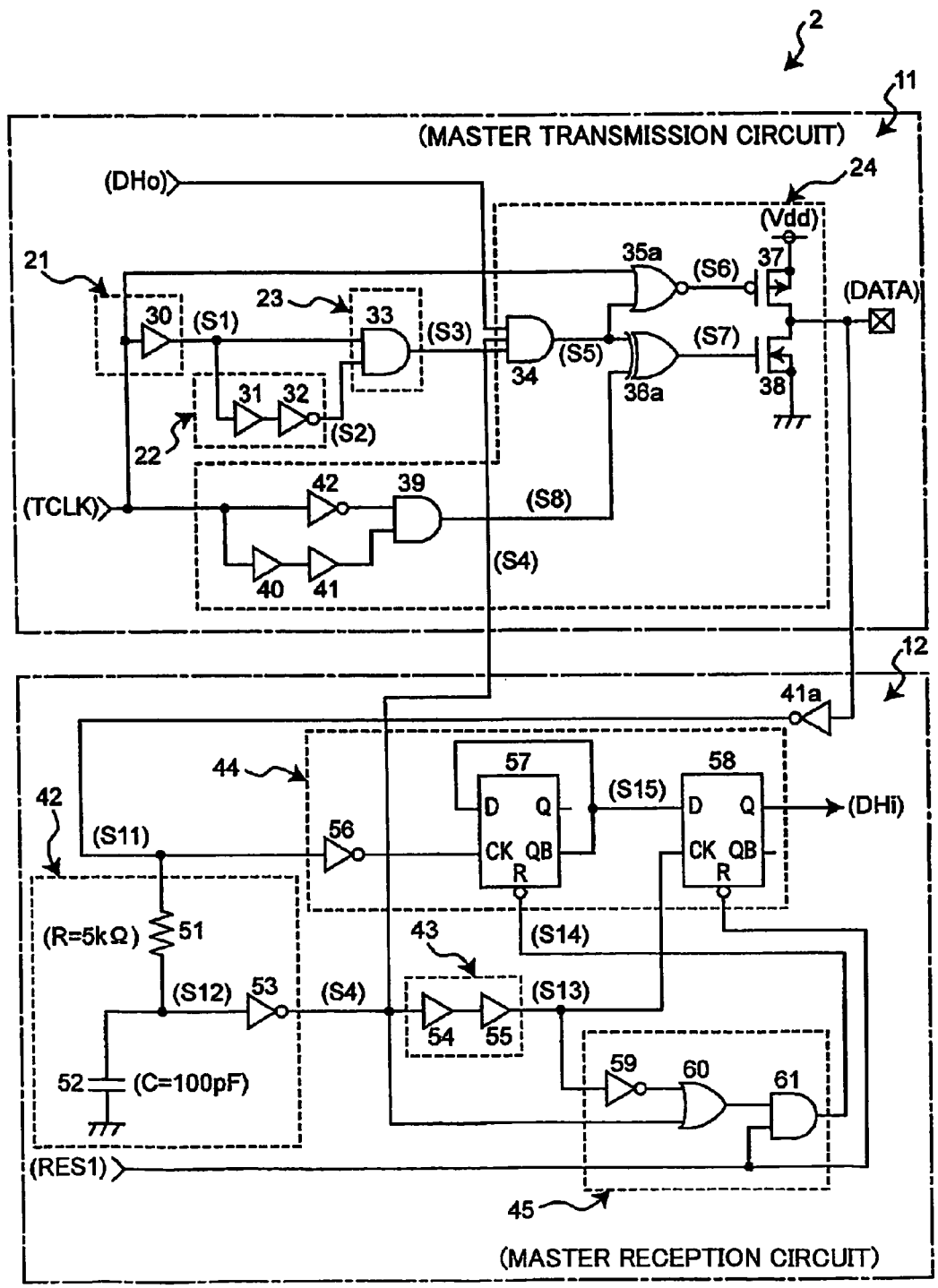
FIG. 13 exemplifies a circuit diagram of the master transmission/reception circuit 2 in FIG. 12.

The master transmission/reception circuit 2 in FIG. 12 is illustrated in FIG. 13.

FIG. 13 exemplifies a circuit diagram of the master transmission/reception circuit 2 in FIG. 12.

In FIG. 13, the same reference numbers are assigned to the same elements as those shown in FIG. 5, and overlapping descriptions are omitted with the difference between them is explained.

Figure 14:
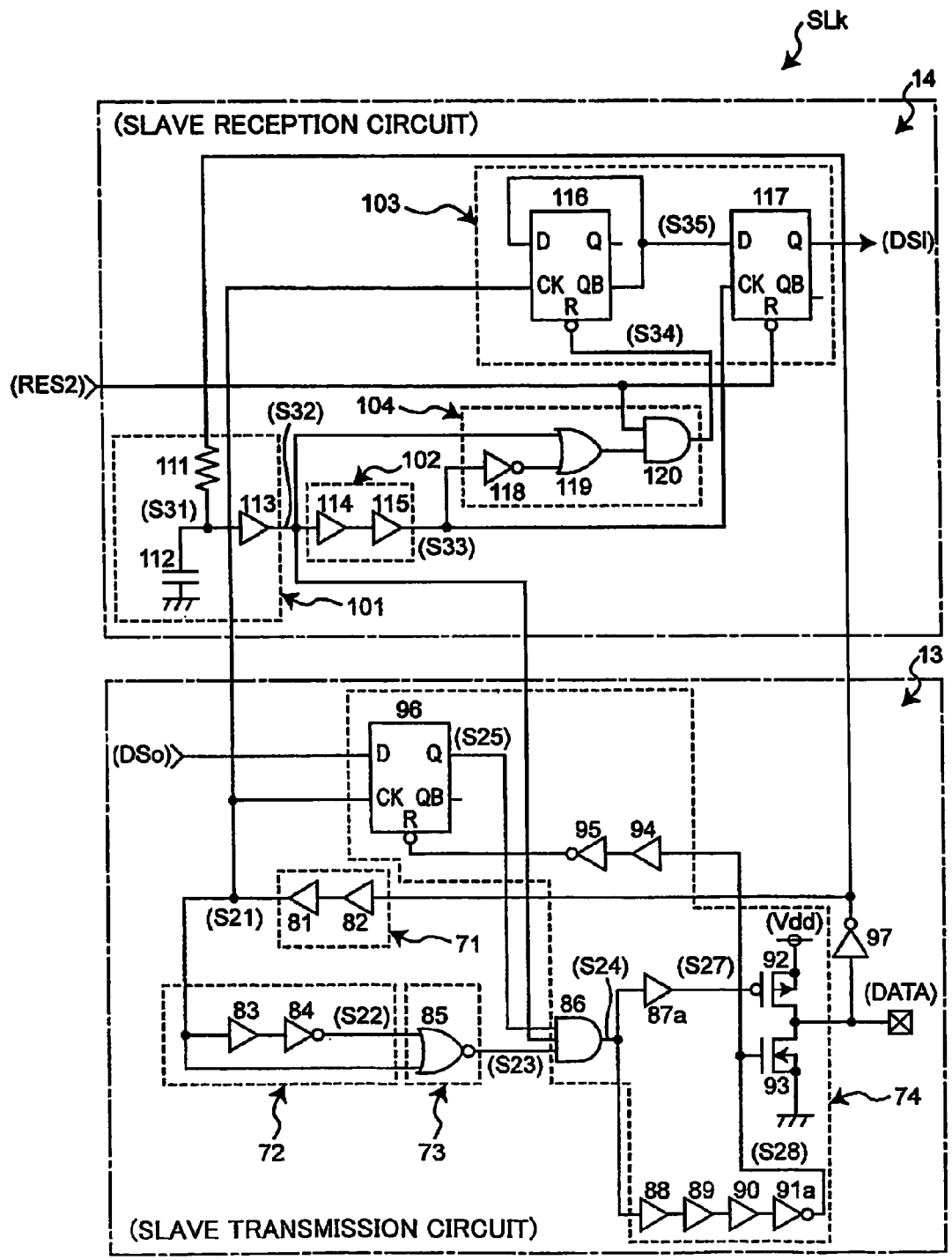
FIG. 14 exemplifies a circuit diagram of the slave transmission/reception circuit SLk in FIG. 12.
Figure 15:
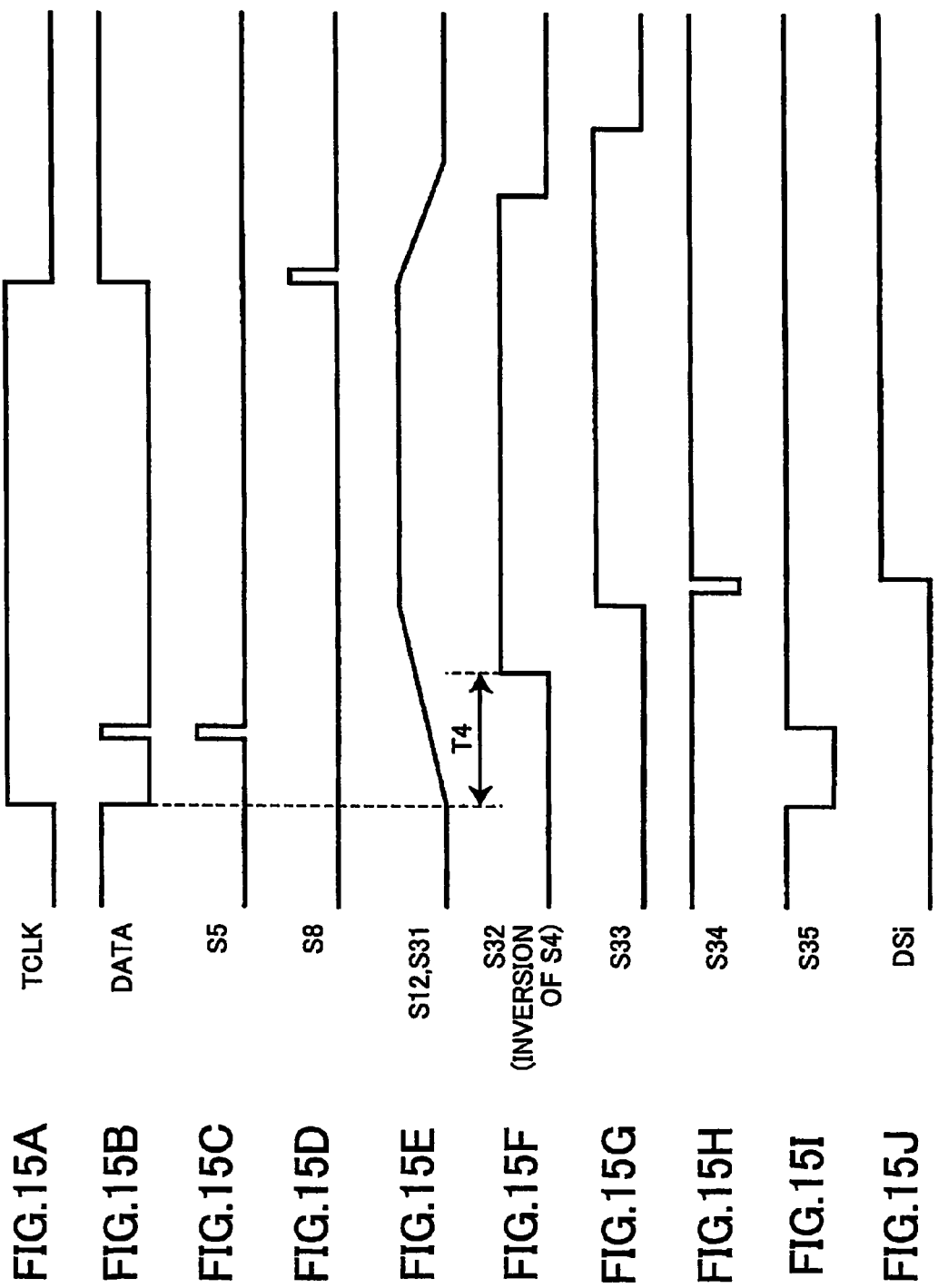
FIG. 15A through FIG. 15J show a timing chart illustrating operations of the master transmission/reception circuit 2 shown in FIG. 13.
Figure 16:
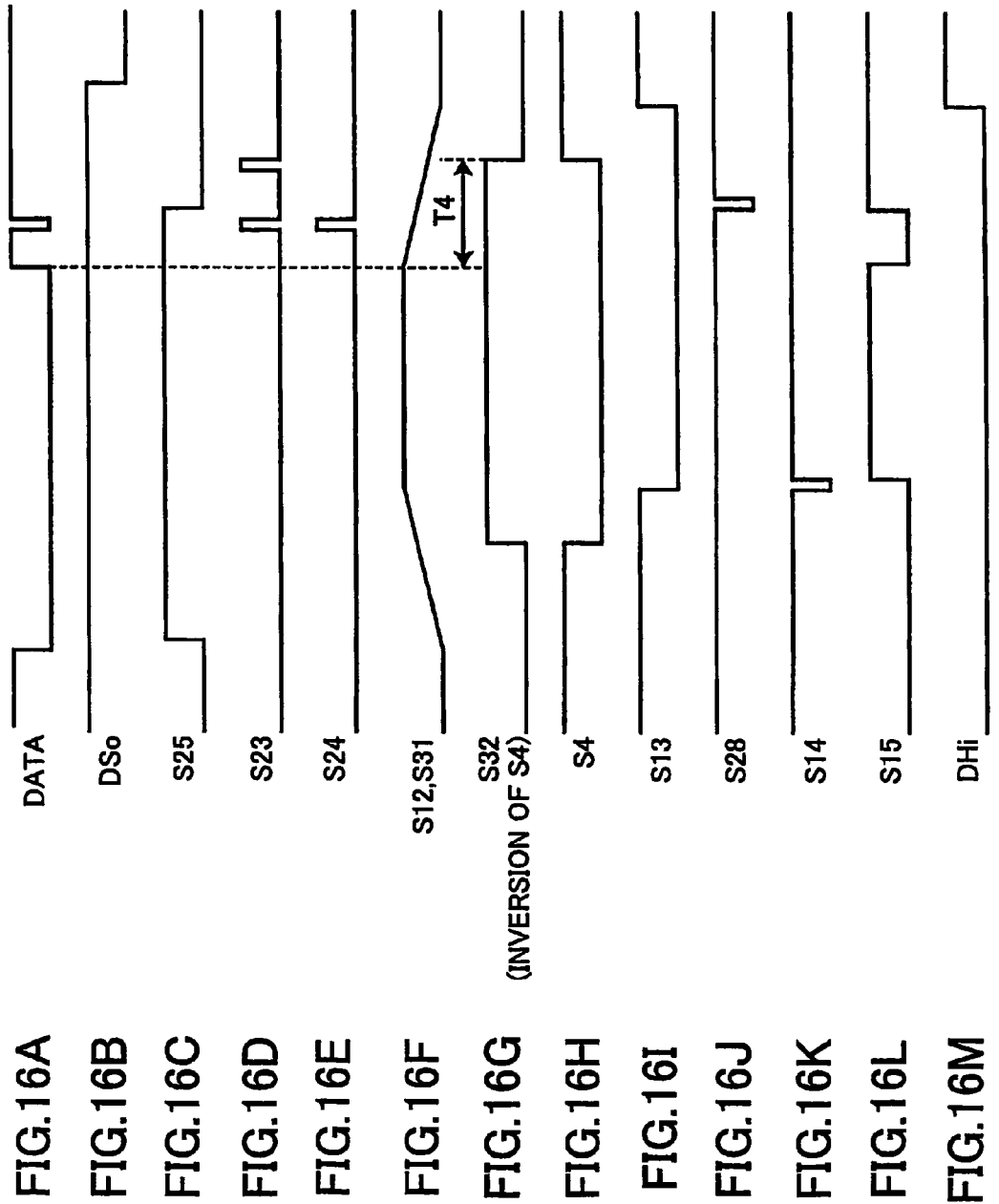
FIG. 16A through FIG. 16M show a timing chart illustrating operations of the slave transmission/reception circuit SLk shown in FIG. 14.
Figure 17:
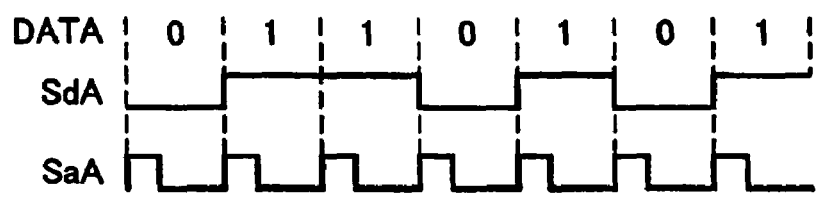
FIG. 17 exemplifies a method of the related art for transmitting serial signals in serial communications.
Figure 18:
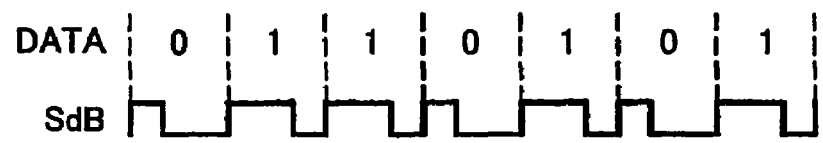
FIG. 18 exemplifies another method of the related art for transmitting serial signals in serial communications.
Figure 19:
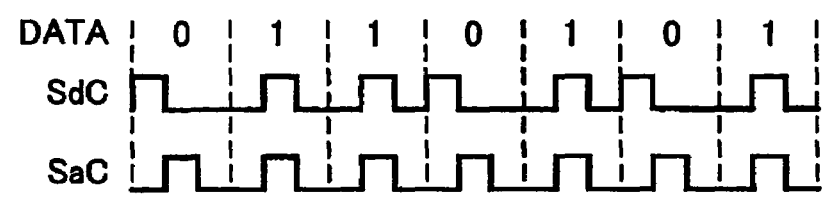
FIG. 19 exemplifies another method of the related art for transmitting serial signals in serial communications.
Figure 20:
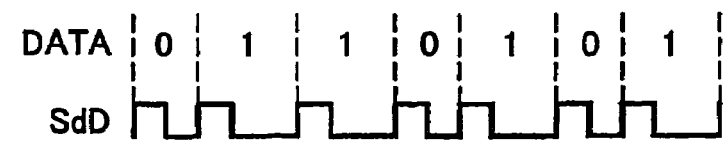
FIG. 20 exemplifies still another method of the related art for transmitting serial signals in serial communications.

The slave transmission/reception circuit SLk in FIG. 12 is illustrated in FIG. 14.

FIG. 14 exemplifies a circuit diagram of the slave transmission/reception circuit SLk in FIG. 12.

In FIG. 14, the same reference numbers are assigned to the same elements as those shown in FIG. 6, and overlapping descriptions are omitted with the difference between them is explained.

In FIG. 13, being different from FIG. 5, in the master transmission circuit 11, the ExNOR circuit 35 is replaced by a NOR circuit 35a, the OR circuit 36 is replaced by an ExNOR circuit 36a. In the master reception circuit 12, the buffer 41 is replaced by an inverter 41a.

With the master transmission/reception circuit 2 in FIG. 13, signals input to the gates for driving the PMOS transistor 37, and the NMOS transistor 38 are changed, the output signal from the NOR circuit 35a is input to the gate of the PMOS transistor 37, and the output signal from the ExNOR circuit 36a is input to the gate of the NMOS transistor 38. The serial data signal DATA is inverted in the inverter 41a and is supplied to the master reception circuit 12.

Therefore, when the clock signal TCLK is at the high level, the serial data signal DATA is at the low level, and when data "1" is transferred to the slave transmission/reception circuit SL1 through SLn in this period, the output signal S5 from the AND circuit 34 is input to the gate of the PMOS transistor 37 and the gate of the NMOS transistor 38, and a high level pulse is superposed on the serial data signal DATA when the serial data signal DATA is at the low level. When the clock signal TCLK goes down to the low level, both the PMOS transistor 37 and the KMOS transistor 38 are turned off, and the output terminal of the master transmission circuit 11 turns to be a high impedance state.

Although the transmission path 4 increases slowly to the high level due to the pull up resistance 7, because of the output signal S8 from the AND circuit 39, the PMOS transistor 37 is turned on for a short time period, and is turned off again. Due to this, when the transmission path 4 is pulled up by the pull up resistance 7, the serial data signal DATA stays at the high level for a short time, the transmission path 4 is fixed to the high level by the pull up resistance 7, and the output terminal of the master transmission circuit 11 is in the high impedance state and is stable.

FIG. 15A through FIG. 15J show a timing chart illustrating operations of the master transmission/reception circuit 2 shown in FIG. 13.

In FIG. 14, being different from FIG. 6, in the slave transmission/reception circuit SLk, the inverter 87 is replaced by a buffer 87a, and the buffer 91 is replaced by an inverter 91a.

With the slave transmission/reception circuit SLk in FIG. 14, signals are input to the gates for driving the PMOS transistor 92 and the NMOS transistor 93.

When the serial data signal DATA changes from the low level to the high level, and when data "1" from the slave transmission/reception circuit SLk is transmitted to the master transmission/reception circuit 2, the pulse signal from the AND circuit 86 is output, and this pulse signal turns on the PMOS transistor 92 for a short time and for the first time.

Hence, when the serial data signal DATA changes to the low level, the PMOS transistor 92 is turned off, and after that, the signal 24 is delayed by the buffers 88 to 90, is inverted by the inverter 91a, and is input to the gate of the NMOS transistor 93, to turn on the NMOS transistor 93 for a short time.

Due to this, when the transmission path 4 is pulled up by the pull up resistance 7, the serial data signal DATA stays at the high level for a short time, the transmission path 4 is fixed to the high level by the pull up resistance 7, and the output terminal of the slave transmission circuit 13 is in the high impedance state and is stable.

FIG. 16A through FIG. 16M show a timing chart illustrating operations of the slave transmission/reception circuit SLk shown in FIG. 14.

As described above, even when the transmission path 4 is pulled up, the master transmission/reception circuit 2 can communicate with the slave transmission/reception circuits SL1 through SLn.

While the present invention is above described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2004-193040 filed on Jun. 30, 2004.

The invention claimed is:

1. A serial communication device comprising a first transmission/reception circuit and at least one second transmission/reception circuit connected to the first transmission/reception circuit by a transmission path for performing serial communication by half-duplex communication between the first transmission/reception circuit and the second transmission/reception circuit, wherein:

the first transmission/reception circuit outputs a serial data signal DATA to the transmission path, said serial data signal DATA being generated by superposing a first superposition pulse having a second level on a portion of a clock signal input from outside having a first level according to binary first transmission data to be output to the second transmission/reception circuit, said clock signal being a binary signal, said second level being reciprocal to said first level;

the second transmission/reception circuit superposes a second superposition pulse having the first level on a portion of the serial data signal DATA input from the transmission path according to binary second transmission data to be output to the first transmission/reception circuit, said portion corresponding to a duration of the clock signal having the second level, the first transmission/reception circuit comprises:

a first transmission circuit that superposes the first superposition pulse on the portion of the clock signal having the first level, and outputs the serial data signal DATA to the transmission path, and a first reception circuit that extracts the second superposition pulse from the serial data signal DATA to extract the second transmission data;

the first transmission circuit comprises:

a first T2 delay circuit that delays the clock signal by a time period T2 and outputs said delayed signal, a first T1 delay circuit that delays the output signal from the first T2 delay circuit by a time period T1 and outputs said delayed signal, a first superposition pulse generation circuit that generates the first superposition pulse having a pulse width T1 from the output signal from the first T2 delay circuit and the output signal from the first T1 delay circuit, and a first output signal generation circuit that superposes the first superposition pulse from the first superposition pulse generation circuit to the clock signal according to the first transmission data, and generates data equaling to one bit sequentially to generate the serial data signal DATA and to transmit the serial data signal DATA to the transmission path; and the first output signal generation circuit sets an output terminal to be in a high impedance state when the serial data signal DATA is at the second level.

2. The serial communication device as claimed in claim 1, wherein the second transmission/reception circuit comprises:

a second transmission circuit that superposes the second superposition pulse on the portion of the serial data signal DATA corresponding to the duration of the clock signal having the second level and transmits a resulting signal to the transmission path; and a second reception circuit that extracts the first superposition pulse from the serial data signal DATA input from the first transmission/reception circuit to extract the second transmission data.

3. The serial communication device as claimed in claim 1, wherein the first transmission circuit superposes the first superposition pulse having the second level and the pulse width T1 on the portion of the clock signal having the first level and a pulse width T3 starting from a predetermined starting point after the time period T2 elapses from the starting point to indicate one of two levels of one bit data in the serial data signal DATA, or the first transmission circuit indicates another one of the two levels of one bit data in the serial data signal DATA when the first superposition pulse is absent after the time period T2 elapses from the starting point; and the first transmission circuit generates and outputs the serial data signal DATA one bit by one bit consecutively to perform serial communication so that the pulse width T1, the pulse width T3, and the time period T2 satisfy:

$T1 < T2 < T3$, and $(T1+T2) < T3$.

4. The serial communication device as claimed in claim 2, wherein the second transmission circuit superposes the second superposition pulse having the first level and the pulse width T1 on the portion of the serial data signal DATA having the second level corresponding to the duration of the clock signal having the second level and a pulse width T3 starting from a predetermined starting point after the time period T2 elapses from the starting point to indicate one of two levels of one bit data in the serial data signal DATA, or the second transmission circuit indicates another one of the two levels of one bit data in the serial data signal DATA when the second superposition pulse is absent after the time period T2 elapses from the starting point; and the second transmission circuit generates and outputs the serial data signal DATA one bit by one bit consecutively to perform serial communication so that the pulse width T1, the pulse width T3, and the time period T2 satisfy:

$T1 < T2 < T3$, and $(T1+T2) < T3$.

5. The serial communication device as claimed in claim 1, wherein the first reception circuit comprises:

a first T4 delay circuit that delays the received serial data signal DATA by a time period T4 equaling to or greater than (T1+T2), and outputs said delayed signal;

a first input signal delay circuit that delays the output signal from the first T4 delay circuit by a predetermined time period and outputs said delayed signal; and a first data extraction circuit that extracts the second transmission data from the received serial data signal DATA and the output signal from the first input signal delay circuit, and outputs the extracted signal.

6. The serial communication device as claimed in claim 5, wherein the second reception circuit comprises:

a second T4 delay circuit that delays the received serial data signal DATA by the time period T4 equaling to or greater than (T1+T2), and outputs said delayed signal;

a second input signal delay circuit that delays the output signal from the second T4 delay circuit by a predetermined time period and outputs said delayed signal; and a second data extraction circuit that extracts the first transmission data from the received serial data signal DATA and the output signal from the second input signal delay circuit, and outputs the extracted signal.

7. The serial communication device as claimed in claim 4, wherein the second transmission circuit comprises:

a second T2 delay circuit that delays the received serial data signal DATA by the time period T2 and outputs said delayed signal;

a second T1 delay circuit that delays the output signal from the second T2 delay circuit by a time period T1 and outputs said delayed signal;

a second superposition pulse generation circuit that generates the second superposition pulse having the pulse width T1 from the output signal from the second T2 delay circuit and the output signal from the second T1 delay circuit; and a second output signal generation circuit that superposes, according to the second transmission data, the second superposition pulse output from the second superposition pulse generation circuit to the portion of the received serial data signal DATA corresponding to the duration of the clock signal having the second level, and generates data equaling to one bit sequentially to generate the serial data signal DATA and to transmit the serial data signal DATA to the transmission path.

8. The serial communication device as claimed in claim 1, wherein when the transmission path is pulled down by a pull-down resistance, the first output signal generation circuit shorts the pull-down resistance for a predetermined time period at a falling time of the serial data signal DATA.

9. The serial communication device as claimed in claim 1, wherein when the transmission path is pulled up by a pull-up resistance, the first output signal generation circuit shorts the pull-up resistance for a predetermined time period at a rising time of the serial data signal DATA.

10. The serial communication device as claimed in claim 7, wherein the second output signal generation circuit sets an output terminal to be in a high impedance state when the serial data signal DATA is at the first level.

11. The serial communication device as claimed in claim 7, wherein when the transmission path is pulled down by a pull-down resistance, the second output signal generation circuit shorts the pull-down resistance for a predetermined time period at a falling time of the serial data signal DATA.

12. The serial communication device as claimed in claim 7, wherein when the transmission path is pulled up by a pull-up resistance, the second output signal generation circuit shorts the pull-up resistance for a predetermined time period at a rising time of the serial data signal DATA.

13. A serial communication method of a serial communication device that includes a first transmission/reception circuit and at least one second transmission/reception circuit connected with the first transmission/reception circuit in a transmission path, and performs serial communication by half-duplex communication between the first transmission/reception circuit and the second transmission/reception circuit, said method comprising the steps of:

superposing a first superposition pulse having a second level on a portion of a clock signal input from outside having a first level according to binary first transmission data to be output to the second transmission/reception circuit, outputting a resulting serial data signal DATA to the transmission path, said clock signal being a binary signal, said second level being reciprocal to said first level; and superposing a second superposition pulse having the first level on a portion of the serial data signal DATA input from the transmission path corresponding to a duration of the clock signal having the second level according to binary second transmission data to be output to the first transmission/reception circuit wherein:

the first transmission/reception circuit comprises a first transmission circuit that superposes the first superposition pulse on the portion of the clock signal having the first level, and outputs the serial data signal DATA to the transmission path and a first reception circuit that extracts the second superposition pulse from the serial data signal DATA to extract the second transmission data;

the first transmission circuit comprises a first T2 delay circuit that delays the clock signal by a time period T2 and outputs said delayed signal, a first T1 delay circuit that delays the output signal from the first T2 delay circuit by a time period T1 and outputs said delayed signal, a first superposition pulse generation circuit that generates the first superposition pulse having a pulse width T1 from the output signal from the first T2 delay circuit and the output signal from the first T1 delay circuit, and a first output signal generation circuit that superposes the first superposition pulse from the first superposition pulse generation circuit to the clock signal according to the first transmission data, and generates data equaling to one bit sequentially to generate the serial data signal DATA and to transmit the serial data signal DATA to the transmission path; and the first output signal generation circuit sets an output terminal to be in a high impedance state when the serial data signal DATA is at the second level.

14. The method as claimed in claim 13, wherein the step of superposing the first superposition pulse includes the steps of:

superposing the first superposition pulse having the second level and pulse width T1 on the portion of the clock signal having the first level and a pulse width T3 starting from a predetermined starting point after time period T2 elapses from the starting point to indicate one of two levels of one bit data in the serial data signal DATA, or indicating another one of the two levels of one bit data in the serial data signal DATA when the first superposition pulse is absent after the time period T2 elapses from the starting point; and generating and outputting the serial data signal DATA one bit by one bit consecutively to perform serial communication so that the pulse width T1, the pulse width T3, and the time period T2 satisfy:

$T1 < T2 < T3$, and $(T1+T2) < T3$.

15. The method as claimed in claim 13, wherein the step of superposing the second superposition pulse includes the steps of:

superposing the second superposition pulse having the first level and pulse width T1 on the portion of the serial data signal DATA having the second level corresponding to the duration of the clock signal having the second level and a pulse width T3 starting from a predetermined starting point after the time period T2 elapses from the starting point to indicate one of two levels of one bit data in the serial data signal DATA, or indicating another one of the two levels of one bit data in the serial data signal DATA when the second superposition pulse is absent after the time period T2 elapses from the starting point; and generating and outputting the serial data signal DATA one bit by one bit consecutively to perform serial communication so that the pulse width T1, the pulse width T3, and the time period T2 satisfy:

$T1 < T2 < T3$, and $(T1+T2) < T3$.

16. A communication system comprising a serial communication device that includes a first transmission/reception circuit connected to a host device and at least one second transmission/reception circuit connected corresponding to slave devices able to communicate with the host device, and performs serial communication by half-duplex communication between the first transmission/reception circuit and the second transmission/reception circuit, said first transmission/reception circuit and said second transmission/reception circuit being connected with each other in a transmission path, wherein:

the first transmission/reception circuit of the serial communication device outputs a serial data signal DATA to the second transmission/reception circuit via the transmission path, said serial data signal DATA being generated by superposing a first superposition pulse having a second level on a portion of a clock signal input from the host device having a first level according to binary first transmission data to be transmitted from the host device to the slave device, said clock signal being a binary signal, said second level being reciprocal to said first level;

the second transmission/reception circuit of the serial communication device superposes a second superposition pulse having the first level on a portion of the serial data signal DATA input from the first transmission/reception circuit transmission path according to binary second transmission data to be output from the corresponding slave device to the host device, said portion corresponding to a duration of the clock signal having the second level;

the first transmission/reception circuit comprises a first transmission circuit that superposes the first superposition pulse on the portion of the clock signal having the first level, and outputs the serial data signal DATA to the transmission path, and a first reception circuit that extracts the second superposition pulse from the serial data signal DATA to extract the second transmission data;

the first transmission circuit comprises a first T2 delay circuit that delays the clock signal by a time period T2 and outputs said delayed signal, a first T1 delay circuit that delays the output signal from the first T2 delay circuit by a time period T1 and outputs said delayed signal, a first superposition pulse generation circuit that generates the first superposition pulse having a pulse width T1 from the output signal from the first T2 delay circuit and the output signal from the first T1 delay circuit, and a first output signal generation circuit that superposes the first superposition pulse from the first superposition pulse, generation circuit to the clock signal according to the first transmission data, and generates data equaling to one bit sequentially to generate the serial data signal DATA and to transmit the serial data signal DATA to the transmission path; and the first output signal generation circuit sets an output terminal to be in a high impedance state when the serial data signal DATA is at the second level.

17. The communication system as claimed in claim 16, wherein the second transmission/reception circuit comprises:

a second transmission circuit that superposes the second superposition pulse on the portion of the serial data signal DATA corresponding to the duration of the clock signal having the second level and transmits a resulting signal to the transmission path; and a second reception circuit that extracts the first superposition pulse from the serial data signal DATA input from the first transmission/reception circuit to extract the second transmission data.

18. The communication system as claimed in claim 16, wherein the first transmission circuit superposes the first superposition pulse having the second level and the pulse width T1 on the portion of the clock signal having the first level and a pulse width T3 starting from a predetermined starting point after the time period T2 elapses from the starting point to indicate one of two levels of one bit data in the serial data signal DATA, or the first transmission circuit indicates another one of the two levels of one bit data in the serial data signal DATA when the first superposition pulse is absent after the time period T2 elapses from the starting point; and the first transmission circuit generates and outputs the serial data signal DATA one bit by one bit consecutively to perform serial communication so that the pulse width T1, the pulse width T3, and the time period T2 satisfy:

$T1 < T2 < T3$, and $(T1+T2) < T3$.

19. The communication system as claimed in claim 17, wherein the second transmission circuit superposes the second superposition pulse having the first level and the pulse width T1 to the portion of the serial data signal DATA having the second level corresponding to the duration of the clock signal having the second level and a pulse width T3 starting from a predetermined starting point after the time period T2 elapses from the starting point to indicate one of two levels of one bit data in the serial data signal DATA, or the second transmission circuit indicates another one of the two levels of one bit data in the serial data signal DATA when the second superposition pulse is absent after the time period T2 elapses from the starting point; and the second transmission circuit generates and outputs the serial data signal DATA one bit by one bit consecutively to perform serial communication so that the pulse width T1, the pulse width T3, and the time period T2 satisfy:

$T1 < T2 < T3$, and $(T1+T2) < T3$.

* * * * *